US008245753B2

(12) United States Patent
Haemerle

(10) Patent No.: US 8,245,753 B2
(45) Date of Patent: Aug. 21, 2012

(54) HAND TOOLS FOR APPLYING MASKING TAPE AND THE LIKE TO VARIOUS SURFACES

(76) Inventor: Richard R. Haemerle, Valley Park, MO (US)

(*) Notice: Subject to any disclaimer, the term of this patent is extended or adjusted under 35 U.S.C. 154(b) by 1453 days.

(21) Appl. No.: 11/620,036

(22) Filed: Jan. 4, 2007

(65) Prior Publication Data

US 2007/0193689 A1 Aug. 23, 2007

Related U.S. Application Data

(60) Provisional application No. 60/766,266, filed on Jan. 5, 2006.

(51) Int. Cl.
*B32B 37/00* (2006.01)

(52) U.S. Cl. .................... 156/579; 7/103; 7/105; 7/167; 30/2; 30/156; 30/274.4; 30/292; 30/329; 30/340; 30/342; 30/337; 16/422; 16/426; 16/430

(58) Field of Classification Search .................... 30/156, 30/274.4, 292, 340, 2, 329, 342, 337; 7/103, 7/105, 167; 16/422, 426, 430; 403/281, 403/319, 318, 397; 156/579
See application file for complete search history.

(56) References Cited

U.S. PATENT DOCUMENTS

| | | | | |
|---|---|---|---|---|
| 1,269,413 | A * | 6/1918 | Finnegan | 81/177.2 |
| 1,510,034 | A | 3/1924 | Brader | |
| 2,296,663 | A | 6/1940 | Gruber | |
| 2,739,725 | A | 2/1953 | Smith | |
| 2,682,414 | A * | 6/1954 | Richardson | 279/77 |
| 3,540,104 | A | 11/1970 | Duffy | |
| 3,935,758 | A | 2/1976 | Polzin et al. | |
| 4,197,605 | A | 4/1980 | King | |
| 4,236,956 | A | 12/1980 | Harrison et al. | |
| 4,790,059 | A * | 12/1988 | Killpack | 29/451 |
| 4,910,821 | A | 3/1990 | Kieferle | |
| 4,974,320 | A * | 12/1990 | Pelletier | 30/123 |
| 5,072,471 | A * | 12/1991 | Isler | 7/158 |
| 5,438,757 | A * | 8/1995 | Weschenfelder | 30/139 |
| 5,509,333 | A * | 4/1996 | Rion | 81/180.1 |
| 5,515,754 | A * | 5/1996 | Elkins | 81/177.9 |
| 5,725,727 | A | 3/1998 | Tutewohl | |
| 5,727,320 | A * | 3/1998 | Shepherd et al. | 30/125 |
| 5,933,918 | A * | 8/1999 | Wallays | 16/114.1 |
| 5,956,788 | A | 9/1999 | Henke | |
| 5,979,058 | A | 11/1999 | Henke | |
| 6,049,970 | A | 4/2000 | Reis et al. | |
| 6,089,298 | A | 7/2000 | Tutewohl | |

(Continued)

*Primary Examiner* — Mark A Osele
*Assistant Examiner* — Nickolas Harm
(74) *Attorney, Agent, or Firm* — Husch Blackwell LLP

(57) ABSTRACT

A plurality of hand tools for use in a wide variety of different applications for applying masking tape to various surfaces prior to painting, staining, detailing, sanding and the like wherein one embodiment includes a removably attachable blade member associated with one end portion of the tool and a removably attachable roller member or nudger member associated with the opposite end portion of the tool, and an extension/retraction mechanism for extending and retracting the blade member. Another embodiment of the present hand tool includes a handle member adaptable for receiving any combination of removably attachable roller members, nudger members, and blade members for attachment to the opposite end portions of the handle member. A wide variety of different blade configurations, roller member configurations, and nudger member configurations can be removably attached to the opposite end portions of the present tools. The present tools along with the various roller members, knife blades and nudger members can also be provided in kit form to accommodate a wide variety of different surface applications.

17 Claims, 16 Drawing Sheets

U.S. PATENT DOCUMENTS

| | | | | |
|---|---|---|---|---|
| 6,226,824 | B1 * | 5/2001 | Hopson et al. | 7/158 |
| 6,276,014 | B1 * | 8/2001 | Lee | 7/158 |
| 6,543,958 | B2 * | 4/2003 | Huang | 403/292 |
| 6,742,562 | B2 | 6/2004 | Pitzen | |
| 6,792,634 | B1 * | 9/2004 | Mills et al. | 7/103 |
| 6,874,188 | B2 * | 4/2005 | Johnson et al. | 7/158 |
| 6,953,196 | B1 * | 10/2005 | Huang | 279/75 |
| 7,284,928 | B2 * | 10/2007 | Perez et al. | 403/322.2 |
| 7,653,970 | B1 * | 2/2010 | Lai | 16/422 |
| 2004/0045172 | A1 * | 3/2004 | Rowlay | 30/162 |
| 2004/0177514 | A1 * | 9/2004 | Kaczorowski | 30/151 |
| 2005/0217114 | A1 * | 10/2005 | Votolato | 30/2 |

* cited by examiner

HAND TOOLS FOR APPLYING MASKING TAPE AND THE LIKE TO VARIOUS SURFACES

CROSS-REFERENCE TO RELATED APPLICATION

This application claims the benefit of U.S. Provisional Application Ser. No. 60/766,266, filed Jan. 5, 2006, the disclosure of which is incorporated herein by reference.

This application is dedicated to the memory of Charles Ray Haemerle, Jr.

BACKGROUND OF INVENTION

This invention relates generally to hand tools and, more particularly, to various embodiments of a wide variety of different types of hand tools for applying various types of tape such as masking tape to various surfaces prior to painting, staining, or detailing adjacent surfaces.

Masking tape and other types of tape with different types of adhesive backing are widely used by painters, auto detailers, and others to mask off various surfaces prior to painting, staining, auto detailing, or applying decals to adjacent surfaces so that the masked surfaces are not painted, stained, or otherwise damaged during the painting, staining, or detailing process. Masking tape is also commonly used for prepping various surfaces for final finishing, repairs, and other applications such as model building. Typically the masking tape is applied by hand and if the edge portion of the tape which abuts the surface to be painted or otherwise repaired is not correctly and fully seated, paint, stain or other working materials will work its way underneath the masking tape and cause ragged or uneven edges and bleeding when the masking tape is removed.

Another problem encountered by painters is a quick and easy way of accurately cutting the tape so that it will more accurately abut adjacent surfaces to be painted or stained in corners and more accurately cover and overlay non-standard surfaces associated with a wide variety of different painted surfaces such as a plurality of grooves and ridges associated with a column or some other decorative design associated with the surface to be painted, stained or otherwise repaired. Since the masking tape is applied to the surface to be masked by hand, it is likewise typically secured to that surface by hand so as to prevent leakage underneath the tape. Such tape is also typically trimmed and cut with a conventional knife blade. Because the surfaces to be masked vary widely and include a wide variety of non-standard surfaces, sealing the masking tape by hand and cutting the tape with a conventional knife blade often results in unsealed and jagged edges which results in leakage underneath the tape and overpainted or overstained surfaces. This not only affects the aesthetic look of the finished product, but it also takes additional time to clean the overpainted or overstained surfaces to achieve a professional look.

It is therefore desirable to provide a variety of different tools for applying masking tape and the like to various surfaces which are easy to manipulate and use regardless of the particular application, which substantially prevent leakage underneath the tape, which substantially reduce clean-up time after a particular application, and which result in a more professional look without additional corrective action.

Accordingly, the present invention is directed to various hand tools for applying tape to various surfaces prior to painting, staining, detailing, or otherwise repairing such surfaces, which invention overcomes one or more of the problems as set forth above.

SUMMARY OF INVENTION

The present invention overcomes many of the shortcomings and limitations of the prior art devices discussed above and teaches the construction and operation of a plurality of different types of hand tools adaptable for use in a wide variety of different applications including painting, staining, auto detailing, applying decals to a wide variety of different types of surfaces, sanding and other repair type applications for applying different types of tape to various surfaces. In one embodiment, the present tool includes a roller member associated with one end portion of the tool for rolling adjacent the edge portion of the masking tape which lies adjacent to the surface to be painted or otherwise repaired so as to accurately secure the tape edge portion to the surface to be masked, and such tool includes a knife edge portion associated with the opposite end portion thereof for cutting the tape at the appropriate length to meet with corners and other mating surface edges to be masked. The tool includes a handle portion which is ergonomically designed to fit within the palm of a user's hand. The center portion of the handle member may include an opening extending therethrough whereby a user can easily pivot the present tool about a finger extending through such opening back and forth between the roller member and the knife blade. It is contemplated that a wide variety of different types of roller members as well as a wide variety of different types of cutting blades can be removably attached to the opposed end portions of the handle member, each roller member being specifically contoured to mate with specific surface edges typically encountered during a painting, staining, detailing or other repair process such as a single edge, double edge, specific corner configurations, and so forth. Importantly, the roller members are removably attachable to one end portion of the handle member so that the appropriate roller member may be used for a particular masking task or other application.

Similarly, a wide variety of different blade configurations may likewise be included for removable attachment to the opposite end portion of the handle member. Here again, the shape of the cutting blade can vary widely depending upon the particular application and depending upon the particular types of edges being encountered during the masking process such as a single edge, double edge, specific corner configurations, grooves, ridges, and other non-standard surfaces. Various methods for removably attaching the roller member and the knife blades are disclosed including a mechanism for extending and retracting the knife blade when needed. The present tool along with the various roller members and knife blades can be provided in kit form to accommodate a wide variety of different surfaces and applications.

Another tool associated with the present hand tools is referred to as a detail pusher or nudger type tool which includes a push type tip member associated with one or both opposite ends of the tool for fully seating the edge of the masking tape to the appropriate surface so as to prevent leakage underneath the tape. In this regard, a plurality of different types of push tip members are removably attachable to one or both ends of the tool, these various shaped and configured tips being used to firmly push against the edge portions of the masking tape in corners and other tight places to again ensure that the masking tape is properly seated against the masked surface to prevent paint or stain leakage underneath the tape. The different styled tips can be rubber type tips, nylon type tips, tips made of composite materials, and metal tips depending upon the particular application. Also, the handle portion of the pusher tool is configured at one or both opposite end portions thereof to removably receive these various tips. In another embodiment, one end portion of the pusher tool may include a roller member for rolling adjacent the edge portion of the masking tape as previously explained. Again, the pusher tool along with the various types of pushing tip members can be provided in kit form so as to accommodate a wide variety of different types of surfaces and applications.

Still further, the present invention includes another small detail roller type tool wherein one or both opposite end portions of the tool is adaptable to again removably receive a plurality of different roller members. This tool can be shaped and dimensioned so as to easily access tight spots and corners and around edges associated with any masking surface. In some instances, the roller members can be made of a soft but firm rubber or sponge material so that they can be squeezed to fit into corners and other hard to reach places to properly seat the masking tape to the masked surface.

Other embodiments of different types of tools including tools with just a knife blade or roller member associated with one end portion of the tool, or other combinations such as a pusher tip member associated with one end portion of the tool and a knife blade associated with the other end portion of the tool, are likewise recognized and anticipated. Still further, the roller members, knife blades and pusher tip members of the present invention can be constructed so as to be attachable/detachable to either end of any one of the present hand tools so that any combination of such members can be attached to the present tool for a particular application. All of these tools are utilized in applying masking tape or the like to a wide variety of different types of surfaces preparatory to working adjacent to the masked surface such as preparatory to painting, staining, detailing, sanding, or performing some other repair work.

These and other features and advantages of the present invention will be apparent to those skilled in the art after considering the following detailed specification in conjunction with the accompanying drawings.

BRIEF DESCRIPTION OF DRAWINGS

For a better understanding of the present invention, reference may be made to the accompanying drawings.

DETAILED DESCRIPTION

Figure 2:
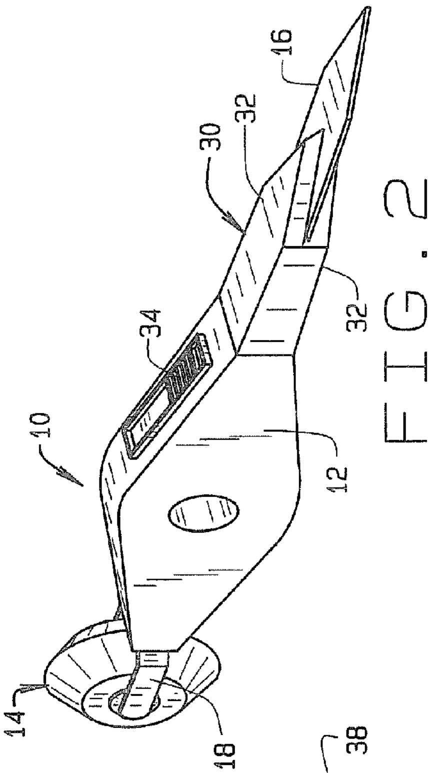
FIG. 2 is perspective view similar to FIG. 1 wherein the knife blade is shown in its extended position.
Figure 1:
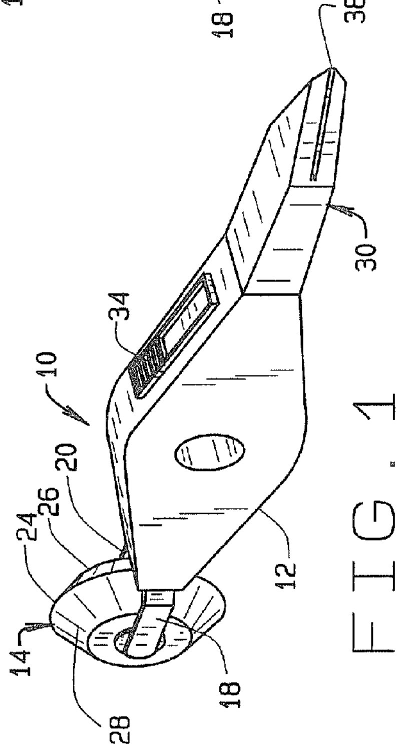
FIG. 1 is a perspective view of one embodiment of one of the present hand tools constructed in accordance with the teachings of the present invention wherein the knife blade is shown in its retracted position.
Figure 3:
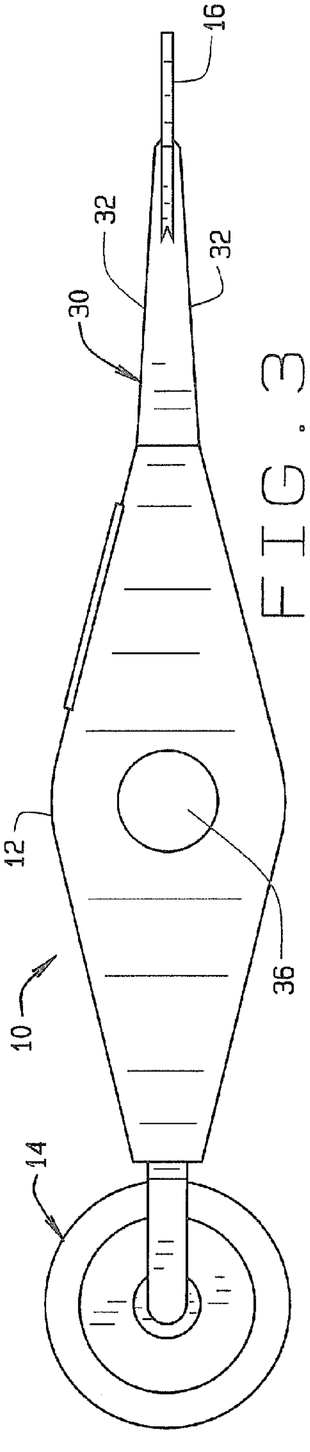
FIG. 3 is a side elevational view of the hand tool of FIGS. 1 and 2.
Figure 4:
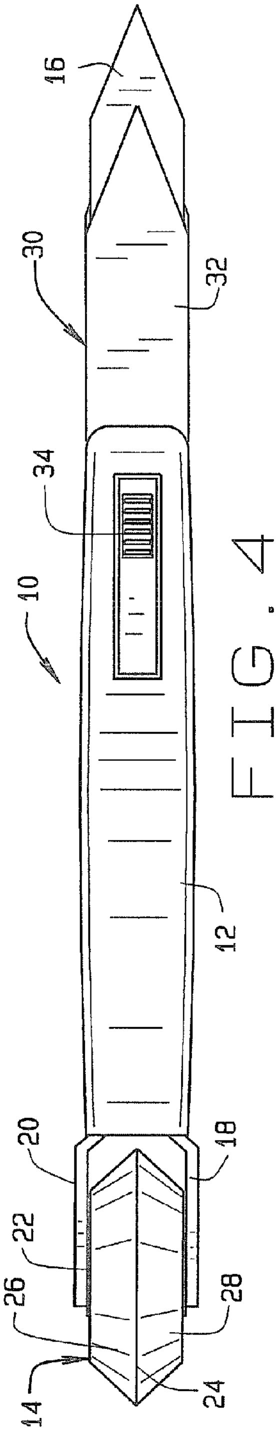
FIG. 4 is a top plan view of the hand tool of FIGS. 1-3.

Referring to the drawings more particularly by reference numbers wherein like numerals refer to like parts, number 10 in FIGS. 1-4 identifies one embodiment of a hand tool made in accordance with the teachings of the present invention wherein FIG. 1 represents a perspective view of the tool with the knife blade in its retracted position; FIG. 2 illustrates the present tool with the knife blade in its extended position; FIG. 3 is a side elevational view of the present tool; and FIG. 4 is a top plan view of the present tool. Although all of the various hand tools disclosed herein for applying masking tape to various surfaces will be described with respect to painting and/or staining adjacent surfaces, it is recognized and anticipated that the present hand tools can be utilized in a wide variety of different applications such as auto detailing, applying decals to a wide variety of different types of surfaces, sanding, stripping, and prepping a wide variety of different types of surfaces including masking for furniture, home repairs, model building and the like. It is also recognized and anticipated that the present tools can be used in conjunction with a wide variety of different types of surfaces such as wood, metal, a wide variety of smooth surfaces, and a wide variety of textured surfaces including a sand finished type surface. Although the present tools are described herein for use in applying masking tape to various surfaces, it is recognized and anticipated that the present tools are adaptable for use with all types of tape or other materials having all different types of adhesive associated therewith for all types of different applications.

As best illustrated in FIGS. 1-4, the tool 10 includes a handle portion 12 which is ergonomically shaped and configured to fit easily within the palm of a user's hand having a roller member 14 associated with one end portion thereof, and a knife blade 16 associated with the opposite end portion thereof. In the embodiment illustrated in FIGS. 1-4, the roller member 14 is removably attachable to a pair of bracket members 18 and 20 as best illustrated in FIG. 4. The bracket members 18 and 20 are securely attached or otherwise connected to one end portion of the handle member 12 in a conventional manner. The bracket members 18 and 20 are positioned and located so as to engage opposite sides of the roller member 14. This can be accomplished by spreading apart the bracket members 18 and 20 so as to engage or disengage a corresponding stud or projection member such as the member 22 associated with each bracket member 18 and 20 with a corresponding cavity or opening associated with opposite sides of the roller member 14. This enables the roller member 14 to be easily removed and replaced with another roller member as will be hereinafter further explained.

The roller member 14 illustrated in FIGS. 1-4 includes a symmetrically positioned circumferential edge 24 which is utilized for rolling adjacent the edge portion of the masking tape which lies adjacent to the painted or stained surface to accurately secure the tape edge portion to the surface to be masked. The roller member 14 includes symmetrically tapered or sloped surfaces 26 and 28 which allows the roller member to be easily maneuvered and/or wedged into corners or other tight locations for properly seating the edge portion of the masking tape with the underlying surface. Although FIGS. 1-4 disclose a pair of bracket members 18 and 20 for removably holding the roller member 14 in its operative position, it is recognized and anticipated that a wide variety of other bracket arrangements including a single bracket can be utilized for removably attaching the roller member 14 to the tool 10 as will be hereinafter further explained.

The knife blade 16 associated with the opposite end portion of tool member 10 is used for cutting the tape at the appropriate length so as to mate with corners and other mating surface edges to be masked. In this regard, the knife blade is likewise preferably removably attachable to the end portion of the handle member 12 so that other appropriately shaped knife blades can be attached depending upon the particular application involved as will be hereinafter explained. Still further, it is preferred that the knife blade 16 likewise be extendable and retractable within a housing member such as the member 30 illustrated in FIGS. 1-4. Housing member 30 can be permanently or removably attached to the handle member 12 and preferably includes a soft membrane type material located on opposite side portions of the knife blade 16 such as a rubber membrane material 32 as best illustrated in FIGS. 2 and 3 so as to avoid damage to the masked surface and adjacent surfaces as the knife blade is being used. A conventional mechanism for extending and retracting the knife blade 16 into and out of its housing 30 or into and out of handle member 12 can be operatively coupled to the knife blade and extension and retraction of the knife blade can be accomplished through the use of a conventional slide mechanism such as the slide mechanism 34 illustrated in FIGS. 1, 2, and 4. A specific mechanism for extension and retraction of the knife blade is disclosed and explained hereinafter with respect to FIGS. 15-20. It is also recognized that housing member 30 could be formed integral with or as part of the handle member 12 and that the blade member 16 could be retracted into and out of the handle member 12.

The handle member 12 includes an opening 36 extending therethrough at a central location along the length thereof whereby a user can easily and quickly pivot the present tool 10 about a finger extending through the opening 36 back and forth between the roller member 14 and the knife blade 16, depending upon which member will be used. When the masking tape edge portion has been accurately secured to the surface to be masked through the use of the roller member, the tool 10 can be quickly pivoted about the user's finger so that the knife blade portion of the tool is in position to cut the tape at the appropriate length to meet with corners and other mating surface edges to be masked. Once the tape is cut, the blade can be retracted and the tool 10 can again be easily pivoted about a user's finger so that the roller member 14 is again operatively positioned for finishing the sealing operation.

Since it is preferred that the knife blade 16 be removably replaceable as will be hereinafter further explained, it is recognized and anticipated that the handle member 12 could be fabricated as a two-piece unit which could be split or otherwise openable for changing the knife blade 16 and/or the roller bracket members 18 and 20. It is also recognized that the housing member 30 could be removably attachable to one end portion of the handle member 12 and that the knife blade 16 could be likewise removably replaceable within the housing member 30. Still further, it is recognized and anticipated that the knife blade 16 does not have to be retractable and could be merely removably replaceable within the housing member 30 so as to be extended at all times. If the handle member 12 is comprised of multiple components, such components can be easily fastened together using conventional fastening means. Still further, blade member 16 can be biased to a closed or retracted position such that movement of the slide mechanism 34 merely acts against a biasing means to extend the blade member 16 for operative use. In this regard, slide mechanism 34 can be moved and positioned from its normally closed position as illustrated in FIG. 1 to a position as illustrated in FIG. 2 wherein blade member 16 is fully extended and slide mechanism 34 is locked in its second position so as to keep the blade member 16 extended. Conventional slide and locking mechanisms are well known in the industry. When knife blade 16 is fully retracted within housing member 30, the distal end or tip 38 can be used as a nudging tool to facilitate proper and accurate sealing of the masking tape edge portion to the surface to be masked as will be hereinafter further explained. Still further, although the bracket members 18 and 20 can be biased towards a position wherein the projection members 22 are engaged with the opening or cavities associated with a corresponding roller member 14, it is likewise recognized and anticipated that other bracket means and other holding means for removably attaching a roller member to one end portion of the tool 10 can likewise be utilized. This may include bracket members or other components that snap fit into one end portion of the handle member 12, cooperatively engageable threaded means, magnetic means, a snap fitting, a jaw and tooth type arrangement, a socket arrangement, and other cooperatively engageable means.

Figure 5:
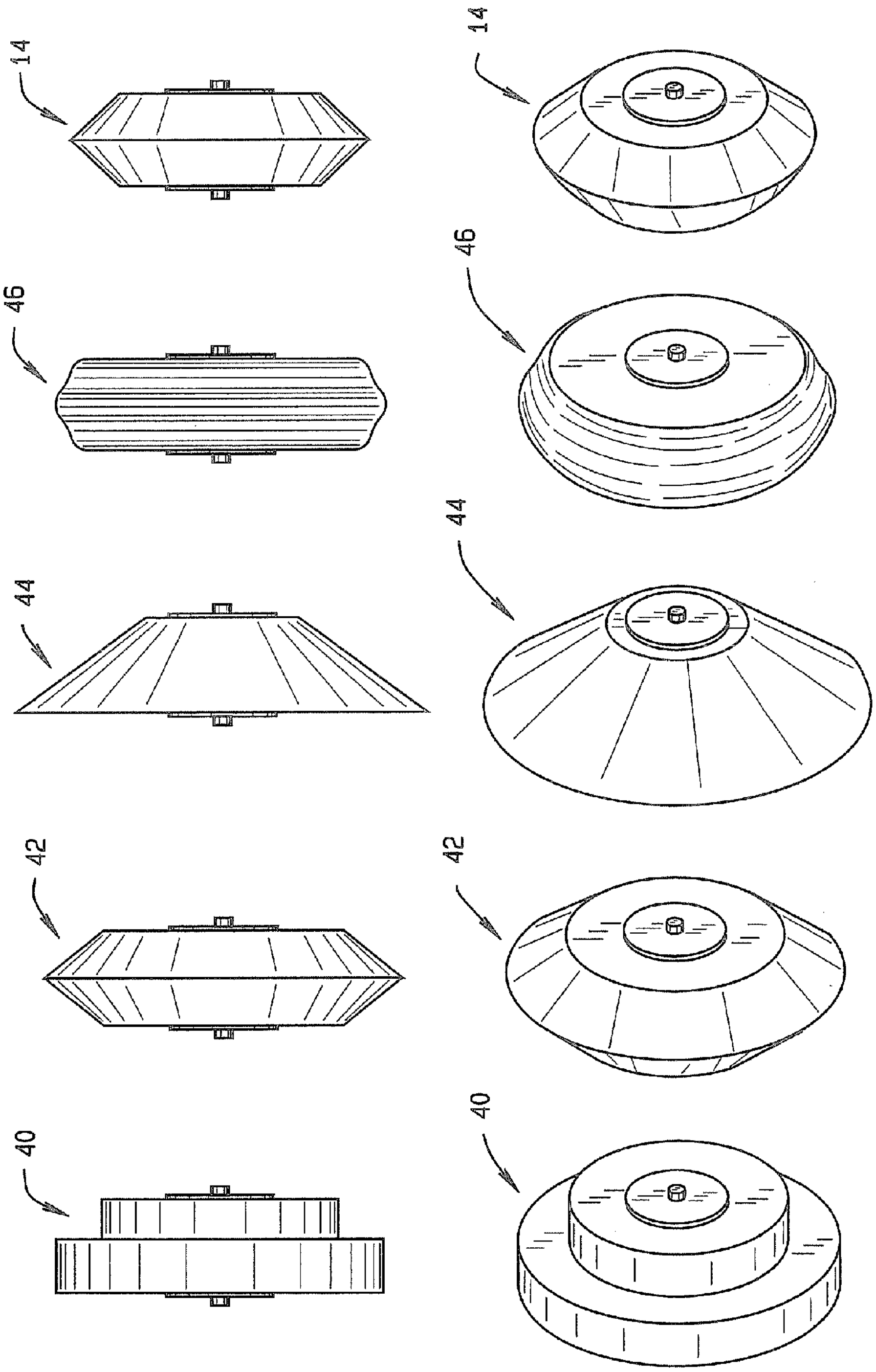
FIG. 5 is an illustration showing both a perspective view and a side elevational view of a plurality of different types of roller members constructed in accordance with the teachings of the present invention.

FIG. 5 illustrates a plurality of different types of roller members which can be removably attached to handle member 12 so as to replace roller member 14. Each of the various roller members illustrated in FIG. 5 are specifically shaped so as to accommodate a wide variety of different masking surfaces associated with a particular application. For example, roller member 40 is specifically designed with a stair step concentric disk configuration for accommodating the edge of rectangular columns as well as a recessed double edge surface, a channel type surface, a corner surface, or other corner mating surfaces. Roller member 42 is somewhat similar to roller member 14 except that the tapered or beveled portions of the roller member are at different angular orientations to accommodate differently shaped or angled surfaces or other double edged mating surfaces. Roller member 44 is frustoconical in shape to accommodate still different mating surfaces and roller member 46 is again somewhat similarly shaped to roller members 14 and 42 except that the tapered or beveled portion of the roller member 46 is again different to accommodate different mating surfaces or other single edged surfaces. It is also recognized and anticipated that the material utilized for each of the specific roller members as well as the density of that material is important for particular applications. For example, the type of material and the density of material utilized for use on wood surfaces can be different from that utilized with respect to metal surfaces. Also, importantly, the density of the material may vary depending upon the texture of the surface such as a smooth surface, a sand finished surface, or a rough textured surface. Still further, the materials utilized for the roller members could be rubber, a wide variety of different types of polymers, a mix or blend of polymers, or a wide variety of other materials so long as such materials are somewhat flexible so that they can be easily maneuvered, manipulated and squeezed into tight spots and corners and around edges associated with any masking surface. It is also anticipated that a coating can be applied to the roller member to enhance its longevity.

Figure 6:
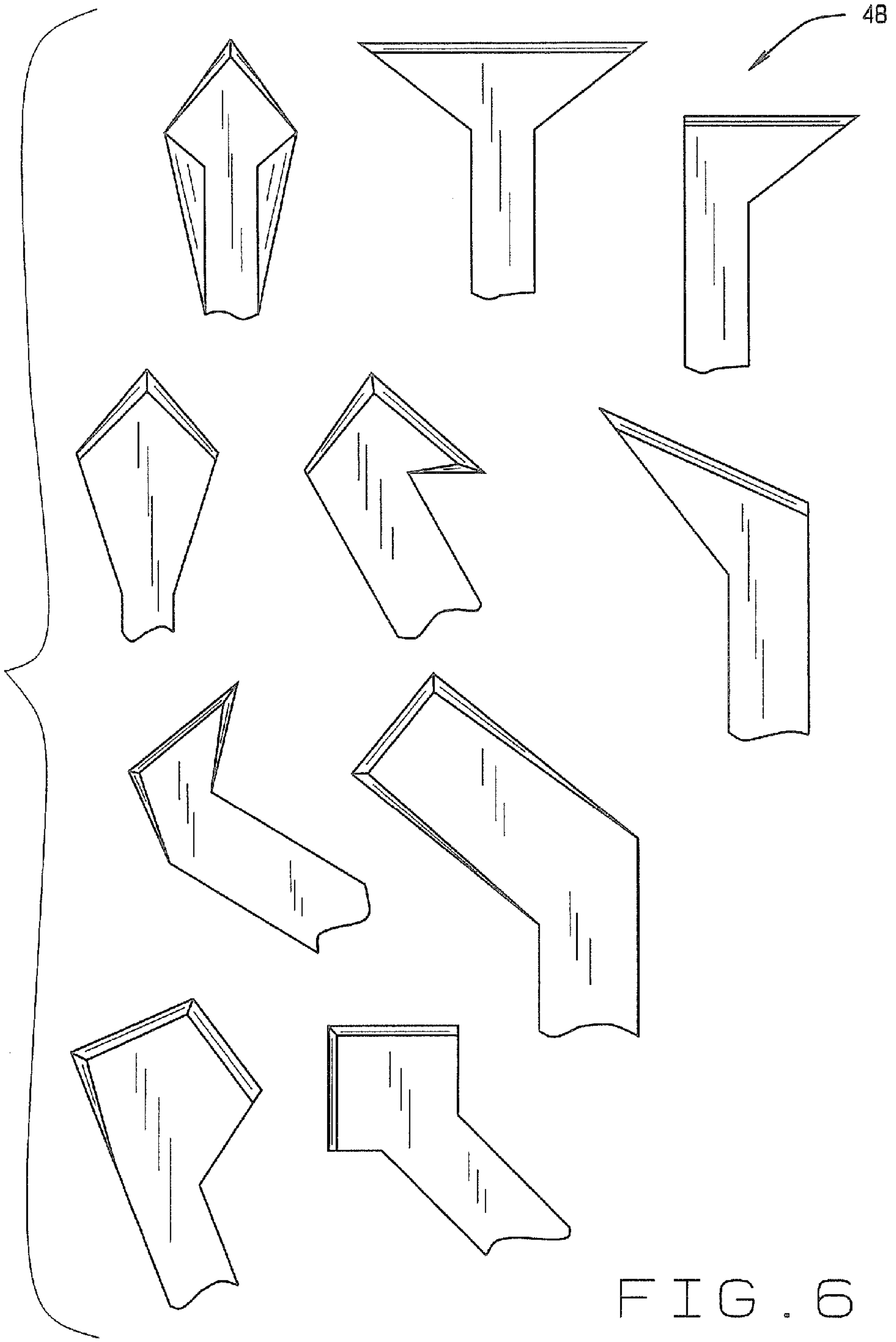
FIG. 6 is an illustration showing a plurality of different knife blades constructed in accordance with the teachings of the present invention.

It is also recognized and anticipated that a wide variety of different types of cutting blades can be utilized with the handle member 12 such as the plurality of cutting blades 48 illustrated in FIG. 6. Here again, the knife blades illustrated in FIG. 6 can take on a wide variety of different shapes and configurations depending upon the particular application involved. These different knife blade configurations are again designed to easily access tight spaces and corners and around edges associated with any masking surface including single and double edged surfaces, corner surfaces, grooves and ridges associated with columns, and other surfaces associated with other decorative design surfaces. Each of the blade members illustrated in FIG. 6 referred to in general terms as blade members 48 include means for being cooperatively removably engageable with a corresponding end portion of handle member 12, and/or with corresponding housing portion 30.

Figure 7:
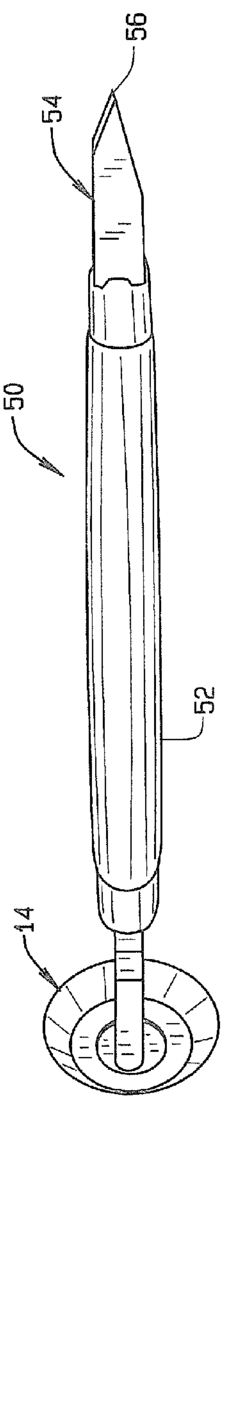
FIG. 7 is a perspective view of one embodiment of another hand tool constructed in accordance with the teachings of the present invention.

FIG. 7 illustrates another embodiment of a hand tool made in accordance with the teachings of the present invention. The tool 50 illustrated in FIG. 7 is commonly referred to as a detail pusher or nudger tool and includes a handle portion 52 having a roller member such as the roller member 14 associated with one end portion thereof and a pusher or nudger type member 54 associated with its opposite end portion. Handle member 52 is somewhat different from handle member 12 in that it is slender in shape so that it can be easily manipulated into tight spots associated with corners and around edges associated with any masking surface as will be hereinafter explained. The means for removably attaching roller member 14 to one end portion of handle member 52 can be substantially similar as that previously disclosed with respect to tool 10 and may include a pair of bracket members as similarly disclosed. As previously explained, it is recognized and anticipated that a wide variety of different types of holding and attachment means may be utilized in conjunction with roller member 14 so long as roller member 14 can be removably replaced with a wide variety of differently shaped roller members such as the roller members illustrated in FIG. 5.

Figure 8:
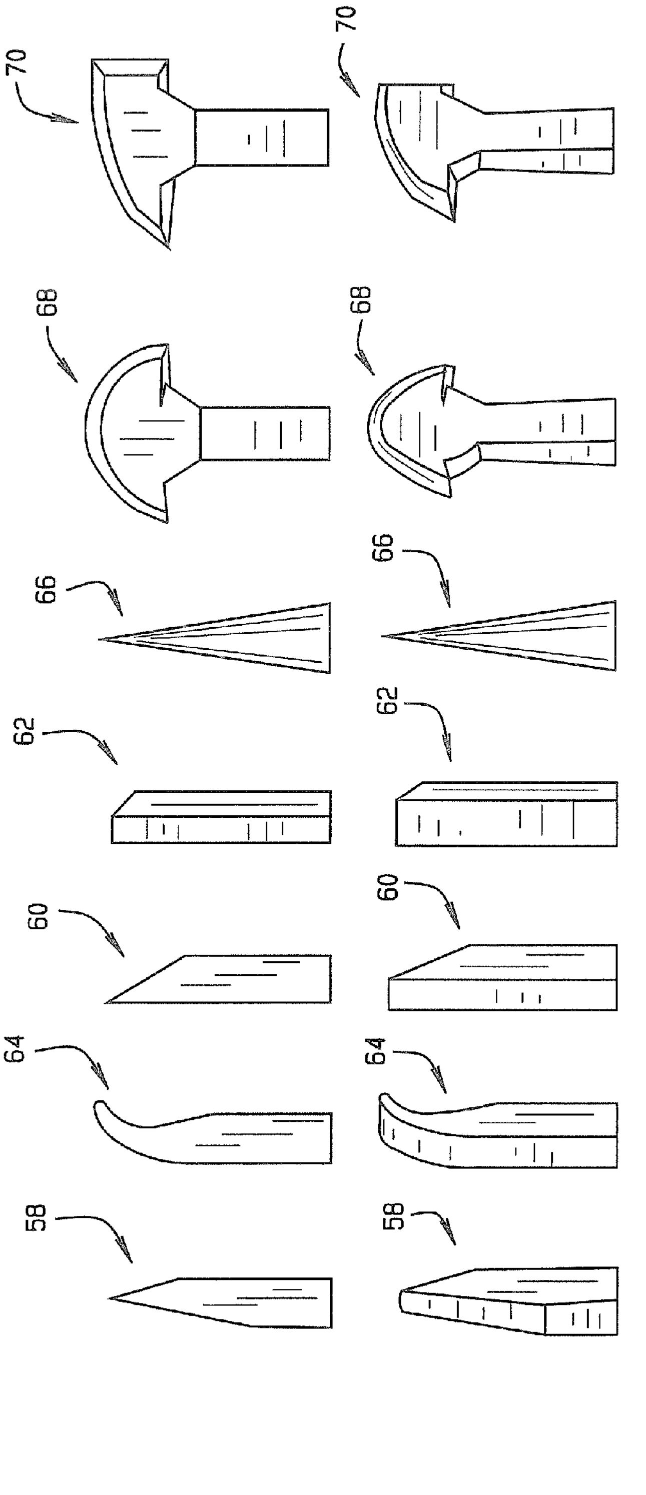
FIG. 8 is an illustration showing both a perspective view and a side elevational view of a plurality of different types of pusher or nudger members constructed in accordance with the teachings of the present invention.

The opposite end portion of tool 50 includes a removably replaceable pusher or nudger member 54 which includes a push tip 56 which can be used to firmly push against the edge portions of the masking tape in corners and other tight places to again ensure that the masking tape is properly seated against the masked surface to prevent leakage underneath the tape. As best illustrated in FIG. 8, a wide variety of different types of pusher or nudger members having variously shaped and configured tips and edge surfaces can be utilized in association with tool 50 so as to accommodate a wide variety of shaped corners and other tight places encountered during a particular masking application. Each of the various pusher or nudger members illustrated in FIG. 8 are removably attachable to one end portion of tool 50 using a wide variety of conventionally known means such as the wide variety of means discussed above with respect to attaching differently shaped roller members to tool 10. For example, pusher members 58 and 60 are geometrically shaped differently so as to present their corresponding tip at a somewhat different angular orientation for accessing different corner or other mating surfaces. In similar fashion, pusher or nudger member 62 is geometrically shaped so as to present a somewhat flat angular surface for accommodating still other mating surface configurations to ensure that the masking tape is properly seated against the masked surface; and pusher or nudger member 64 presents an arcuate or curved tip portion whereas pusher or nudger member 66 presents an pointed tip surface. Pusher or nudger members 68 and 70 present differently oriented arcuate and other tip surfaces for again accommodating correspondingly shaped masking surfaces. As with the plurality of roller members illustrated in FIG. 5 and the plurality of different knife blades illustrated in FIG. 6, the plurality of differently shaped pusher or nudger members illustrated in FIG. 8 can likewise be provided in kit form along with tool member 50 to accommodate a wide variety of different applications.

Figure 9:
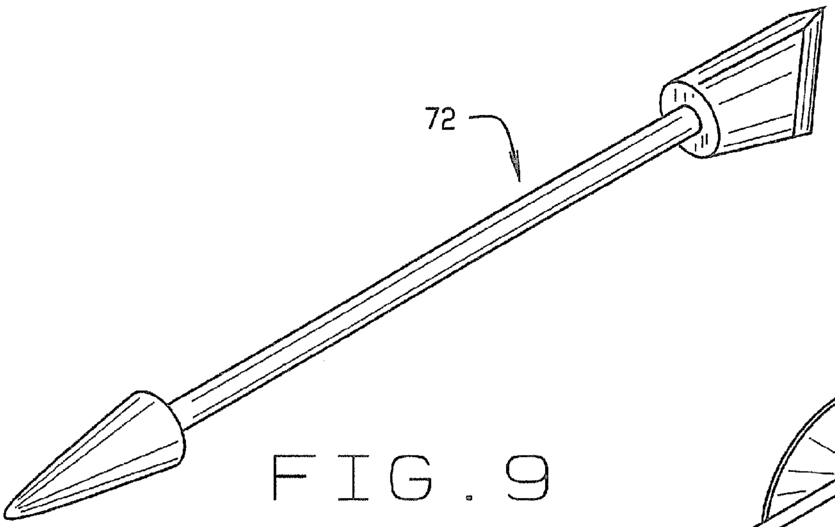
FIG. 9 is a perspective view of still another embodiment of a hand tool constructed in accordance with the teachings of the present invention.

It is also recognized and anticipated that tool member 50 could be configured so as to replace roller member 14 with a knife blade similar to the construction and arrangement associated with tool member 10. It is also anticipated and recognized that tool member 50 could be configured to include a roller member at each opposite end portion thereof, or a pusher or nudger member at each opposite end portion thereof. Other combinations of roller members, knife blades, and pusher or nudger members are likewise recognized and anticipated. A pusher or nudger tool 72 having a nudger member associated with each opposite end portion thereof is illustrated in FIG. 9. Importantly, the pusher or nudger members can be used to push and/or slide across the edge portions of the masking tape along its entire length including in tight spots in corners and around the edges associated with any masking surface to ensure that the masking tape is properly seated against the masked surface. It is also recognized that nudger tool 72 could be economically made as a throw away tool once the nudger members are sufficiently worn. In this embodiment, the nudger members would be fixedly attached to each opposite end portion of the tool 72.

Figure 10:
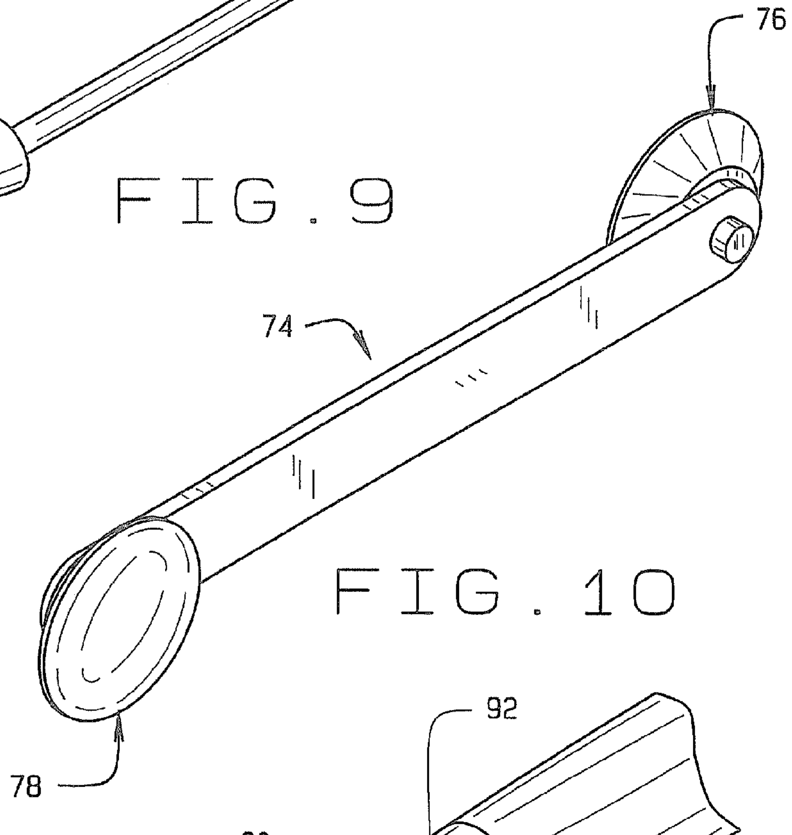
FIG. 10 is a perspective view of still another embodiment of a hand tool constructed in accordance with the teachings of the present invention.

FIG. 10 illustrates still another embodiment of a hand tool 74 constructed in accordance with the teachings of the present invention wherein both opposite end portions of the tool 74 are adapted to removably receive a different roller member such as the roller members 76 and 78. Tool member 74 can be shaped and dimensioned so as to easily access tight spots in corners and around edges associated with any masking surface. In some instances, the roller members 76 and 78 can be made of a soft but firm rubber or sponge material so that they can be squeezed to fit into corners and other hard to reach places to properly seat the masking tape to the masked surface. In this regard, the overall size and shape of all of the tool members disclosed herein including tool members, 10, 50, 72 and 74 can be sized and shaped in a wide variety of different configurations to accommodate different applications. Tool 74 can likewise be made economically and roller members 76 and 78 could be permanently affixed to the tool. In addition, as illustrated in FIG. 10, the roller members 76 and 78 can likewise be positioned and located on opposite sides of the handle member.

Figure 11:
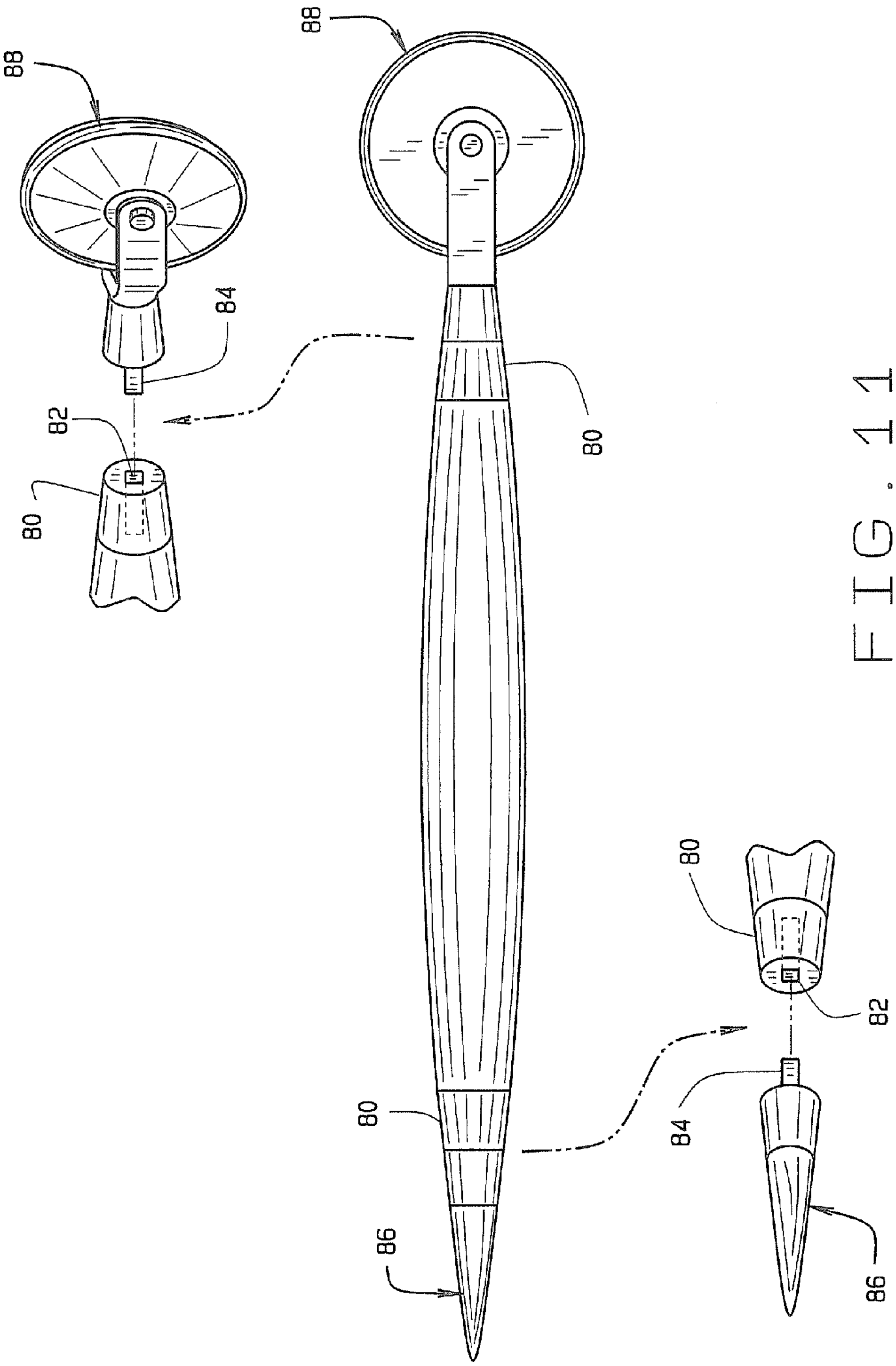
FIG. 11 is a perspective view showing another embodiment of attachment means for cooperatively attaching the roller members and nudger members to respective end portions of the handle member associated with any one of the hand tools constructed in accordance with the teachings of the present invention.

FIGS. 11-14 illustrate still other means for cooperatively attaching the roller members, knife blades, and pusher or nudger members to respective end portions of the handle member associated with any one of the various tools described herein such as tool members 10, 50, 72 and 74 for applying masking tape and the like to various surfaces. For example, FIG. 11 illustrates a socket type arrangement wherein one end portion 80 of a handle member includes a recessed cavity or socket 82 adaptable for cooperatively receiving a corresponding projection or formed insert 84 associated with either a pusher or nudger member 86 or a roller member 88. The projection or insert 84 can be frictionally engaged with or otherwise wedged into the socket or cavity 82, or other holding means can be associated with either the projection 84 or the cavity 82 to retain the members 86 and 88 therewithin. As can be seen with respect to roller member 88, in this particular embodiment, roller member 88 includes a supporting frame or bracket which may include a pair of bracket members similar to bracket members 18 and 20, or it may include a single bracket member, or other supporting arrangement, all of which support structures include a projection or insert member 84 for cooperatively engaging cavity 82 as previously explained. Also, importantly, if the insert member 84 is rectangular, or any other shape other than circular, the member 84 will prevent the roller member or nudger member from rotating or otherwise turning within cavity or socket 82 during use. It is also recognized that a knife blade member could likewise be provided with the socket arrangement disclosed above wherein the blade member would include a projection member such as the member 84 which would be cooperatively received within a cavity such as the cavity 82.

Figure 12:
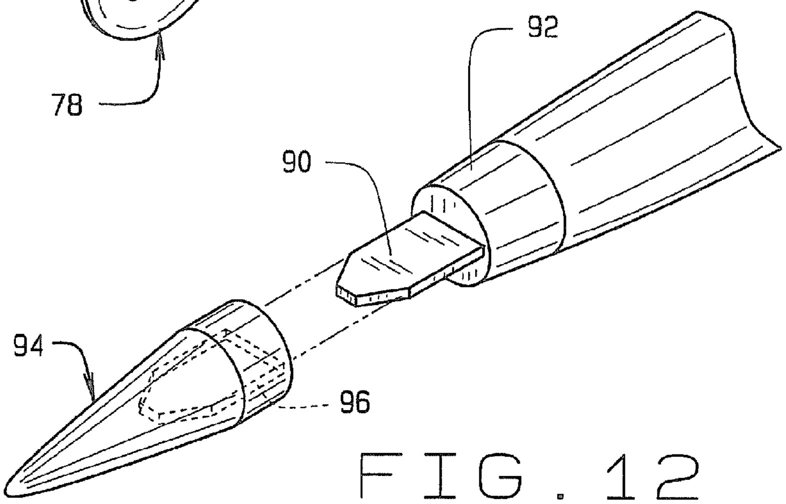
FIGS. 12-14 illustrate still other means for cooperatively attaching the roller members and nudger members to respective end portions of the handle member associated with any one of the hand tools constructed in accordance with the teachings of the present invention.

FIG. 12 illustrates still another means for connecting the removably attachable portions associated with the present invention. FIG. 12 represents the reverse arrangement illustrated in FIG. 11 wherein the projection member 90 is associated with one end portion 92 of the handle member and the pusher or nudger tool 94 includes a recessed cavity or socket 96 adaptable for receiving the projection member 90 therewithin. Here again, once the projection member 90 is inserted within the cavity 96, a friction fit is accomplished, or the projection member 90 is suitably wedged within cavity 96 to provide a suitable connection therebetween. It is recognized and anticipated that the support structure or bracket arrangement associated with one of the roller members constructed in accordance with the teachings of the present invention such as the roller member construction 88 can likewise include a cavity or socket 96 adaptable for receiving a similar projection 90.

Figure 13:
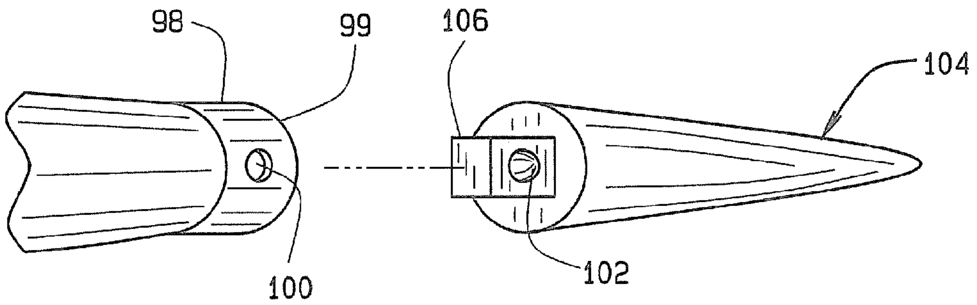

Still further, FIG. 13 illustrates still another cooperatively engageable means for likewise attaching any one of the roller members, knife blades, or nudger members to one end portion of the handle member associated with any of the various tools 10, 50, 72 and 74. As illustrated in FIG. 13, one end portion 98 of one of the present handle members includes an opening 99 adapted to receive a member 106 associated with a pusher or nudger member 104. The member 106 includes a snap or button 102 which is spring biased and located such that as the member 106 is inserted into the opening or recessed cavity 99 associated with the handle end portion 98, the snap or button 102 can be moved into a position wherein the snap or button 102 extends through an opening 100 in handle end portion 98 thereby locking and holding the nudger member 104 in position. Depressing the snap or button 102 and pulling the nudger member 104 out of the cavity 99 will removably detach the nudger member 104 from handle end portion 98. This type of connection means is well known in the industry.

Figure 14:
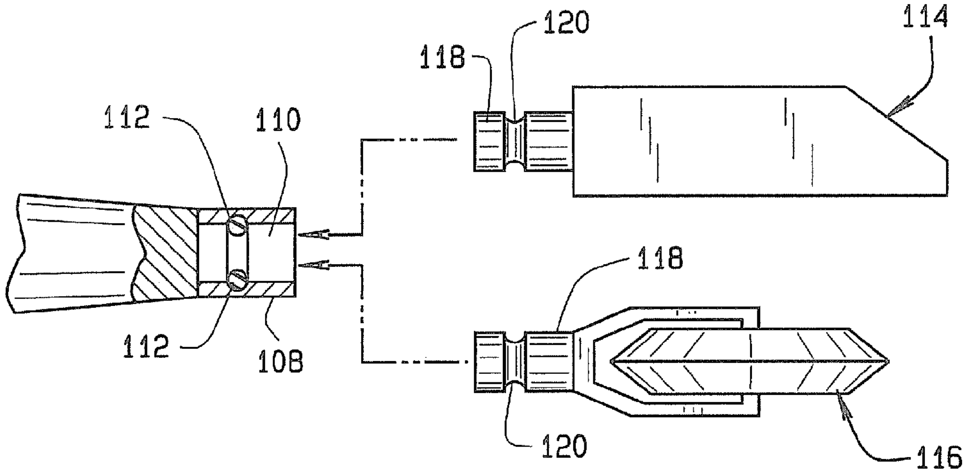

Still further, FIG. 14 illustrates another connection means wherein the one end portion 108 of one of the handle members associated with the various tools of the present invention includes a cavity 110 having a circumferential projection 112 associated therewith. The nudger member 114 or the roller assembly 116 each include a projection 118 having a recessed circumferential portion 120 associated therewith, the recessed portion 120 mating with the projection 112 when the projection 118 is slidably positioned within the cavity 110. Here again, once the projection 112 mates with the recessed portion 120, the nudge member 114 or roller member assembly 116 will be sufficiently locked into an operative position for use. A pull force exerted away from the end portion 108 of the handle member will disengage the projection 112 from the recessed portion 120 thereby allowing the nudger member 114 or roller member assembly 116 to be removably detached from the handle member. Here again, it is also recognized that the connection means including use of the circumferential portions 108 and 120 could likewise be used in association with a removably attachable knife blade member.

Figure 15:
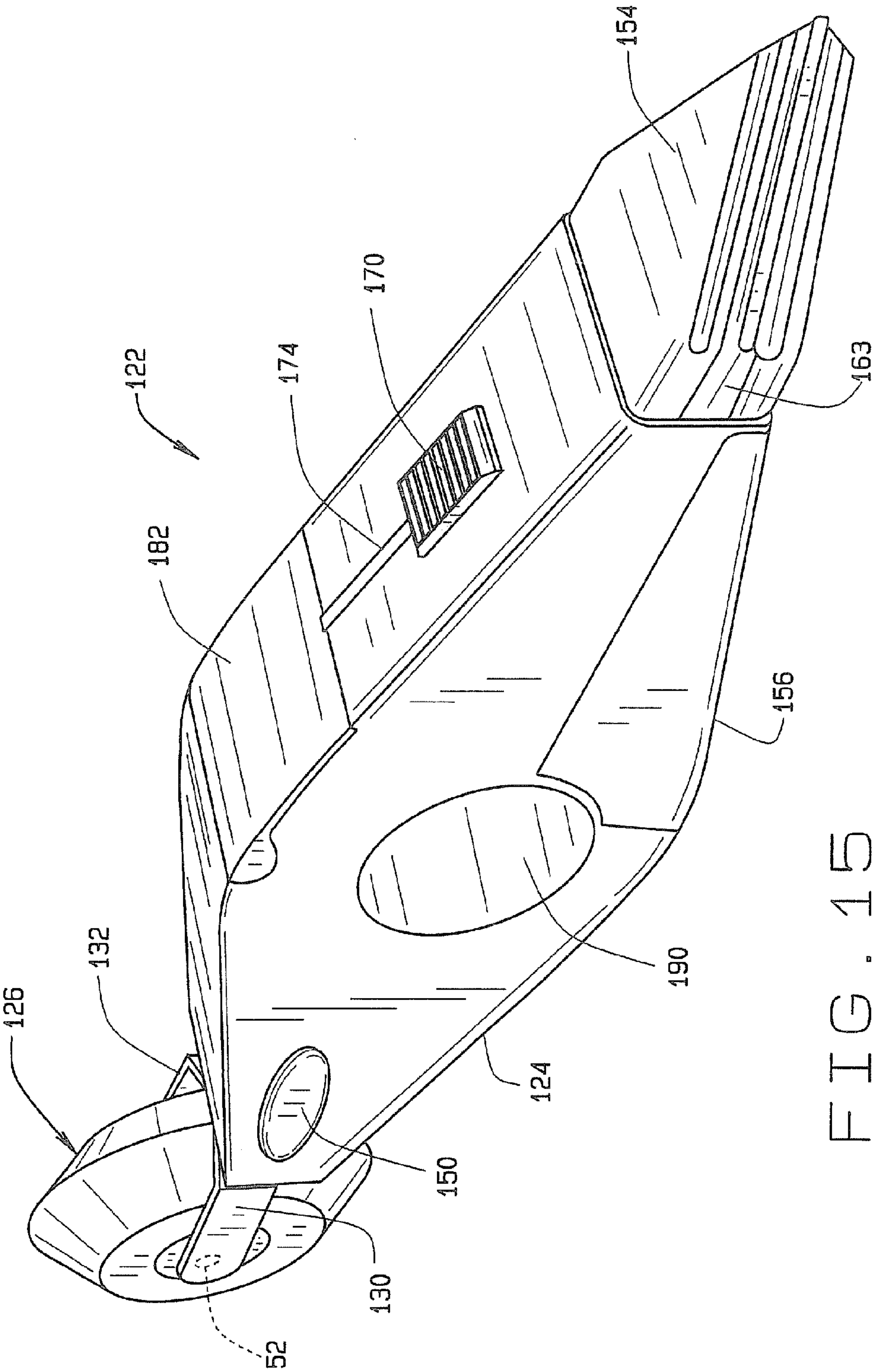
FIG. 15 is a perspective view of still another embodiment of a hand tool constructed in accordance with the teachings of the present invention.
Figure 16:
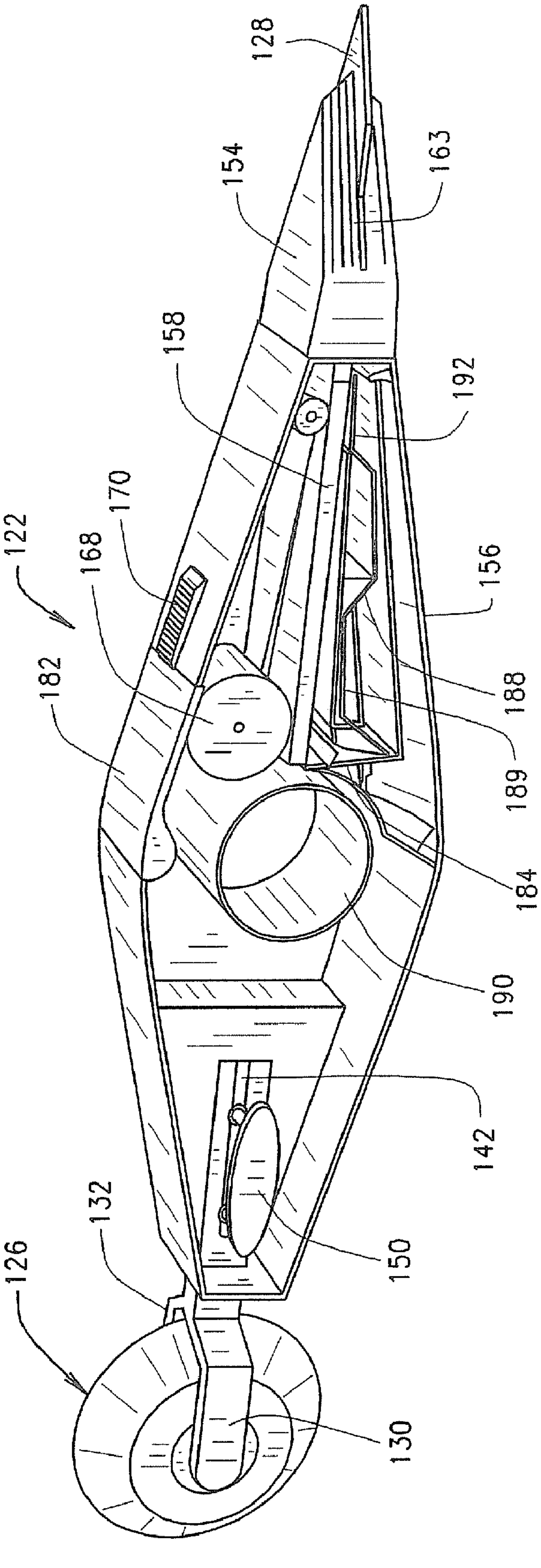
FIG. 16 is a cutaway perspective view of the hand tool of FIG. 15 showing the attachment mechanism associated with the roller member and the extension and retraction mechanism associated with the knife blade.
Figure 17:
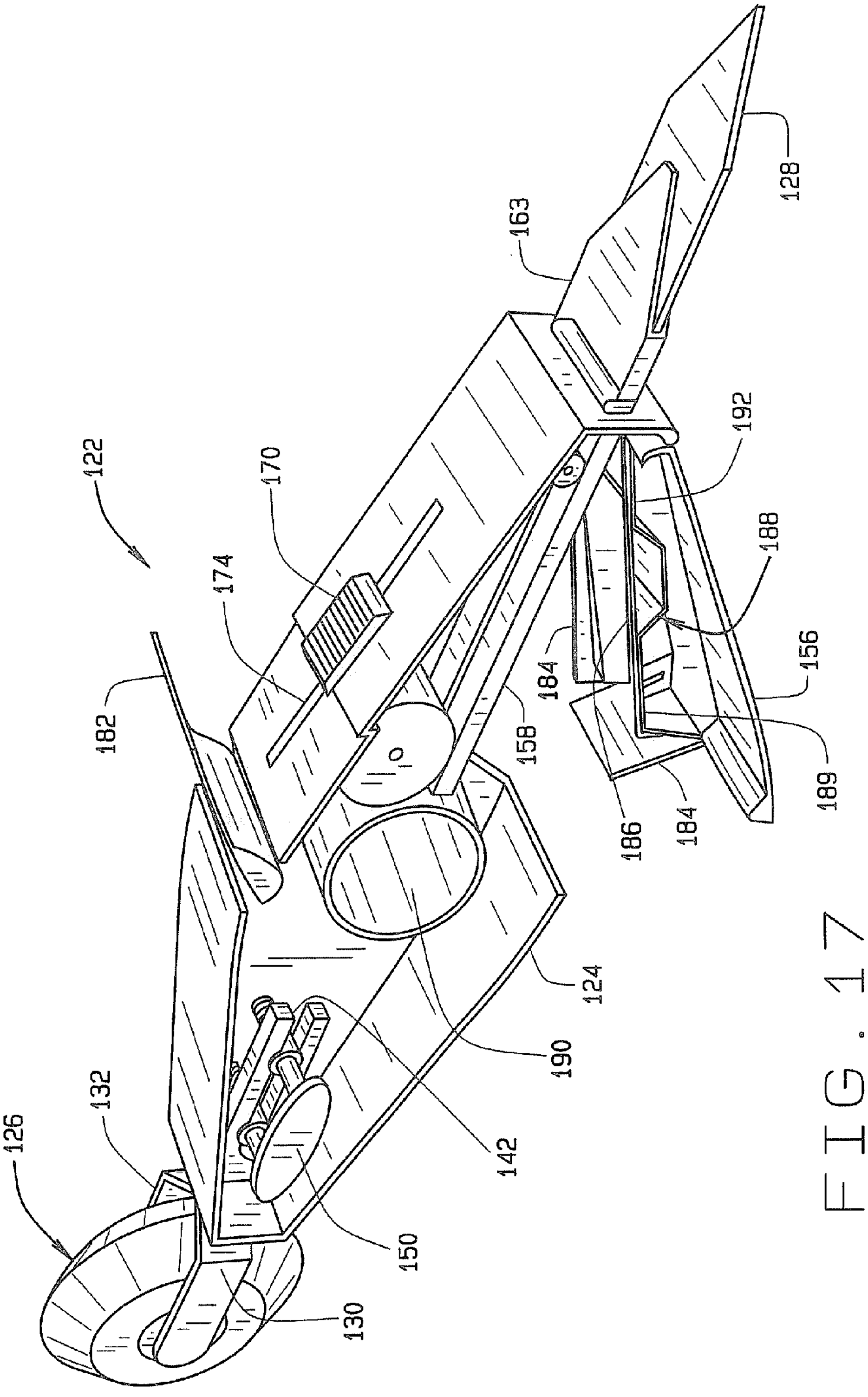
FIG. 17 is a cutaway perspective view of the hand tool of FIG. 15 showing the door members associated with the extension and retraction mechanism in their open position.
Figure 18:
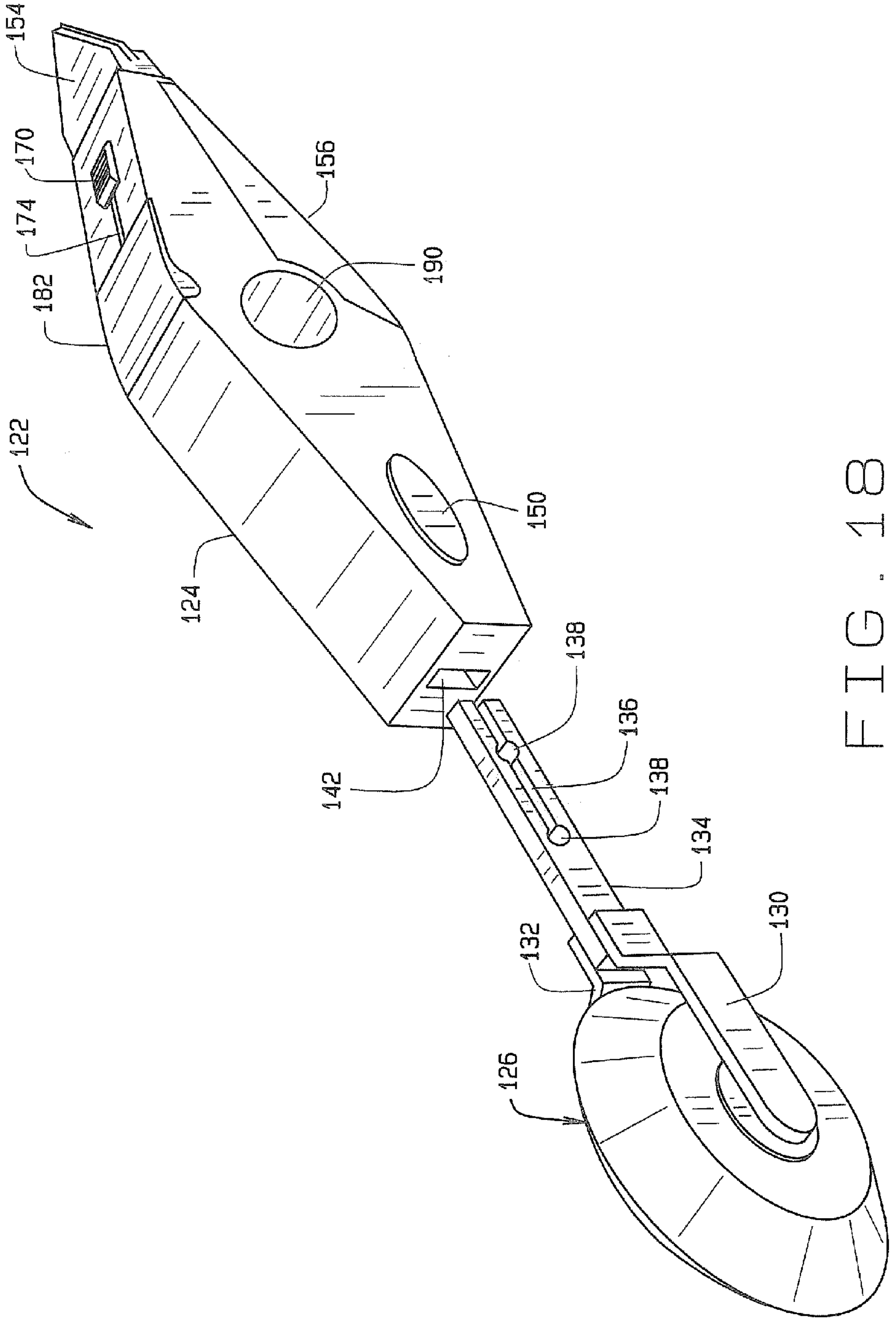
FIG. 18 is a perspective view of the hand tool of FIG. 15 showing the roller member in its removed position.
Figure 19:
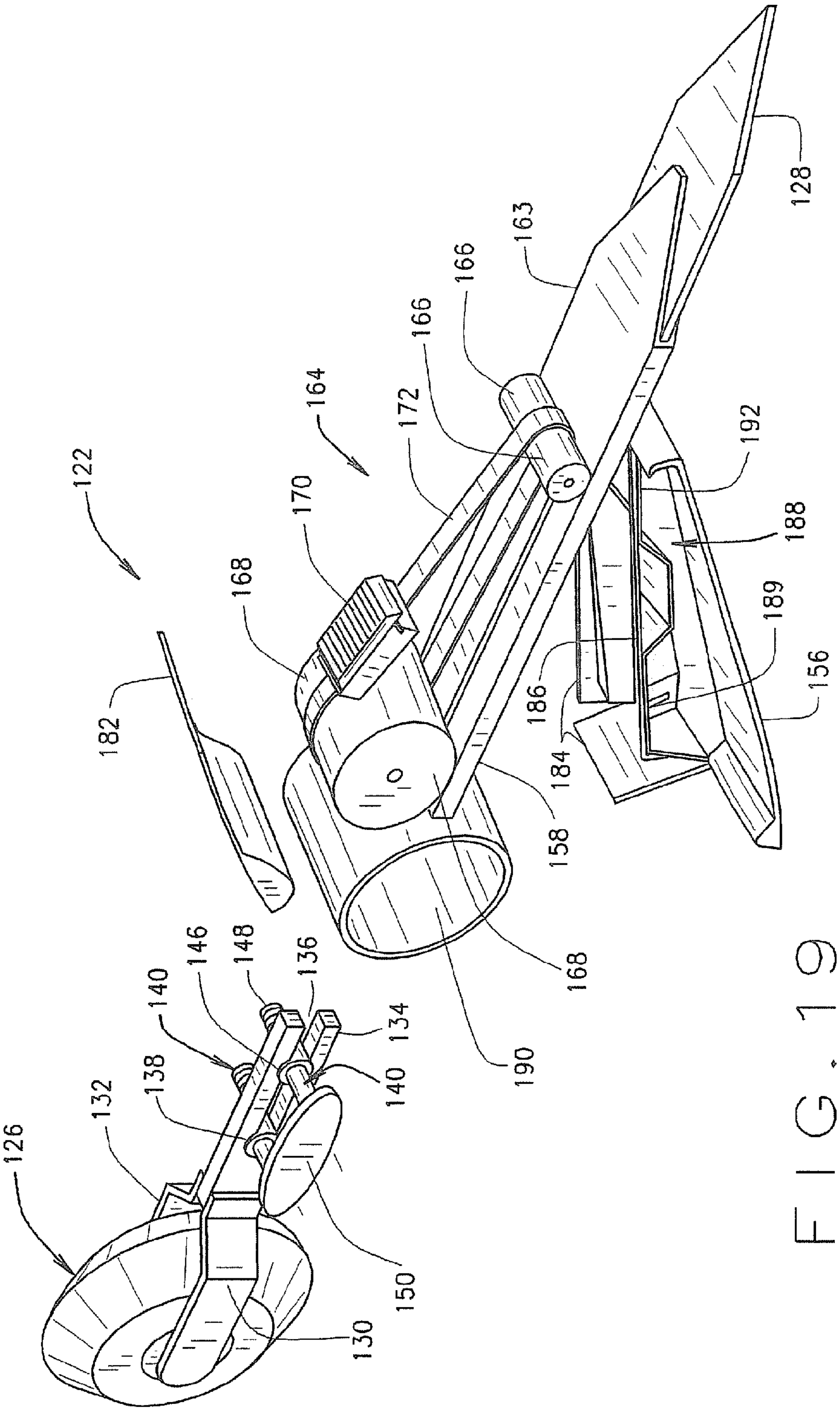
FIG. 19 is a partial exploded view of the roller member assembly and the extension and retraction knife blade mechanism associated with the hand tool of FIG. 15.

FIGS. 15-20 disclose another embodiment of a hand tool 122 made in accordance with the teachings of the present invention, the tool 122 being similar to tool 10 but including a different mechanism for extending and retracting the knife blade as will be hereinafter farther explained. The tool 122 includes a handle portion 124 which is likewise shaped and configured to easily fit within the palm of a user's hand having a roller member 126 associated with one end portion thereof, and a knife blade 128 (FIG. 16) associated with the opposite end portion thereof. FIGS. 15 and 18 show the blade member 128 in its retracted position whereas FIGS. 16, 17 and 19 show the blade member in its extended position.

Figure 20:
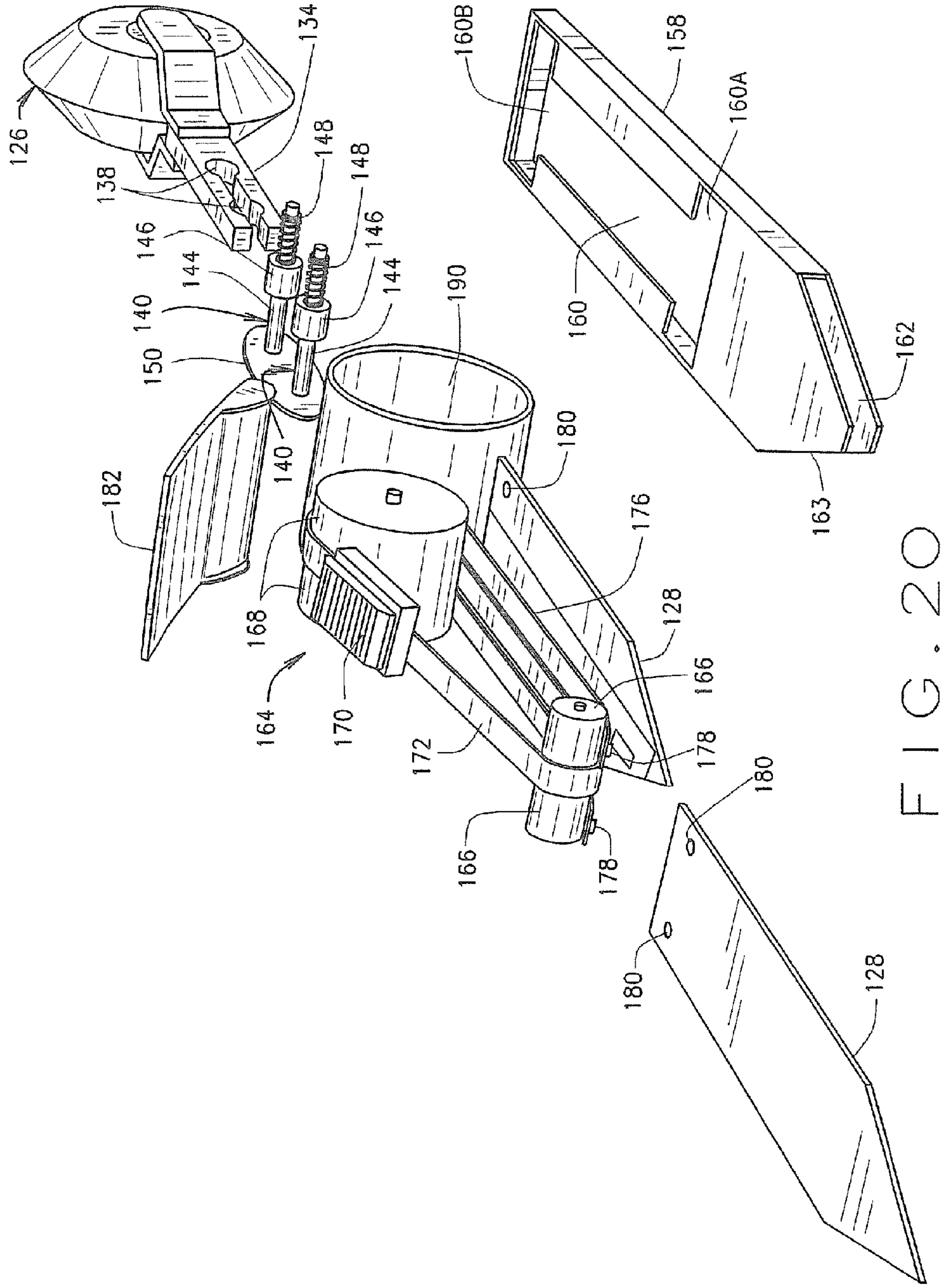
FIG. 20 is another partial exploded view of the roller member assembly and the extension and retraction knife blade mechanism associated with the hand tool of FIG. 15.

Roller member 126 is removably attachable to a pair of bracket members 130 and 132 as best illustrated in FIGS. 17-20. The bracket members 130 and 132 are attached to or integrally formed with a bracket member 134 which includes an elongated slot 136 as best illustrated in FIGS. 18-20. The elongated slot 136 includes a pair of spaced apart recesses 138 adapted to receive a pair of corresponding pin members 140 as best illustrated in FIGS. 17-20. One recessed slot portion 138 is located at one end portion of the slot 136 and the other recessed slot portion 138 is located at an intermediate location therealong as illustrated. The recessed slot portions 138 are positioned and located so as to align with and engage the pin members 140 when the bracket member 134 is positioned within the handle portion 124. In this regard, one end portion of the handle member 124 includes a slot or opening 142 as best illustrated in FIGS. 16 and 17 for receiving the bracket member 134. The pin members 140 are strategically positioned and located within the handle portion 124 and within the handle opening 142 so as to engage the recessed slot portions 138 when the bracket member 134 is positioned within the handle opening 142 as will be hereinafter further explained.

As best illustrated in FIGS. 19 and 20, each pin member 140 includes a reduced diameter portion 144 and an enlarged diameter portion 146. The enlarged diameter portion 146 of each pin member 140 is adapted to be cooperatively received within the recessed portions 138 of the bracket slot 136. The reduced diameter portion 144 of each pin member 140 is sized and shaped so as to freely slide within the slot 136 when the bracket member 134 is positioned within the handle opening 142. The pin members 140 are positioned within the handle portion 124 and within the handle opening 142 as best illustrated in FIGS. 16 and 17, one end portion of each pin member 140 having a spring member 148 or other biasing means associated therewith and the opposite end portion of each pin member 140 being attached to or otherwise associated with a push button member 150 as clearly illustrated in FIGS. 19 and 20. The enlarged diameter portion 146 of each pin member 140 is located at an intermediate location between the respective opposite end portions thereof. The pin members 140 are positioned within the handle opening 142 and are biased by the biasing means 148 such that the enlarged diameter portions 146 of each respective pin member 140 will be positioned and located within the opening 142 such that when the bracket member 134 is inserted therewithin, the bracket slot 136 will be in alignment with the enlarged diameter pin portions 146 which will prevent the roller member 126 from being inserted therewithin. Attachment of the roller member 126 to the one end portion of the tool handle portion 124 is accomplished by pushing and holding the push button member 150 inwardly towards the biasing means 148 such that the pin members 140 will move in a direction along their longitudinal axis and the enlarged diameter portions 146 will be offset to one side of the bracket member 134 and its corresponding slot 136 and the smaller diameter pin portion 144 will now be aligned with the bracket slot 136. With the push button member 150 held in its pushed or engaged position against the biasing members 148, the bracket slot 136 will freely slide and move over the reduced diameter pin portions 144 allowing the bracket member 134 to be fully inserted within the handle opening 142. Once the roller bracket 134 is fully inserted within the handle opening 142, the recessed slot portions 138 will be in alignment with the pin members 140 such that when the push button member 150 is released, the biasing means 148 will move the enlarged diameter pin portions 146 into the recessed slot portions 138 thereby holding the bracket member 134 in a locked position within the handle opening 142. Removal of the roller member 126 is accomplished in reverse order by again pushing the push button member 150 inwardly against the biasing means 148 so as to move the enlarged diameter pin portions 146 out of the recessed slot portions 138 thereby allowing the bracket member 134 to be slidably moved away from the handle portion 124 thereby removing the roller member 126 from the tool 122.

Like the bracket members 18 and 20 associated with tool 10, the bracket members 130 and 132 are likewise positioned and located so as to engage opposite sides of the roller member 126. This can be accomplished by spreading apart the bracket members 130 and 132 so as to engage or disengage a corresponding stud or projection member such as the member 152 associated with each side of the roller member 126 with a corresponding cavity or opening associated with each bracket member 130 and 132. This enables the roller member 126 to be easily removed and replaced with another roller member such as any one of the roller members previously discussed with respect to FIG. 5. In this regard, it is also recognized and anticipated that the projection 152 could be associated with each of the bracket members 130 and 132 and that each roller member such as the roller member 126 could include a corresponding cavity or opening associated with each opposite side thereof for engaging the projection member associated with each bracket member. A wide variety of other bracket arrangements including a single bracket can likewise be utilized for removably attaching the roller member 126 to the tool 122 and all such additional configurations are contemplated and anticipated. Any one of the roller members illustrated in FIG. 5 as well as other roller members could be used with the tool 122.

The knife blade member 128 associated with the opposite end portion of tool member 122 is likewise preferably removably attachable to or removably positionable within the handle portion 124 so that other appropriately shaped knife blades can be attached depending upon the particular application involved as will be hereinafter explained. Also, as explained with respect to tool 10, it is preferred that the knife blade member 128 likewise be extendable and retractable within the handle member 124 for all of the reasons discussed above with respect to tool member 10. In the particular embodiment illustrated in FIGS. 15-20, the opposite end portion of handle portion 124 includes a housing member 154 which can be permanently or removably attached to the handle portion 124 and preferably is comprised of a soft membrane type material such as a rubber membrane material through which the blade member 128 will extend therethrough. The housing member membrane material 154 is located on opposite side portions of the knife blade 128 and functions to avoid damage to the masked surface and adjacent surfaces as the knife blade is being used. The distal end or tip of the housing member 154 likewise functions as a nudging tool when the knife blade 128 is retracted as previously explained to facilitate proper and accurate sealing of the masking tape edge portion to the surface to be masked.

FIG. 16 is a cutaway view of the tool 122 illustrating a specific mechanism for extending and retracting the knife blade member 128 into and out of its housing member 154, and FIGS. 19 and 20 are exploded views illustrating the construction and operation of the extension and retraction mechanism. As best illustrated in FIG. 17, the handle member 124 includes a pivotally attached door member 156 which, when opened, provides access to the extension and retraction mechanism for loading at least one knife blade 128 within a knife holding member 158. The knife holding member 158 is shaped and dimensioned as best illustrated in FIG. 20 and includes an opening associated with its bottom surface for receiving the knife blade 128 therethrough as will be hereinafter further explained. The top surface of the knife holding member 158 includes an I-shaped opening 160, the opening portion 160A being adapted to receive a portion of the front pulley or roller members 166 associated with the extension and retraction slide mechanism 164 whereas the opening portion 160B is adapted to receive a portion of the rear pulley or roller members 168 associated with the extension and retraction slide mechanism 164 as best illustrated in FIG. 19. The blade holding member 158 likewise includes an opening or slot 162 associated with the front end portion 163 thereof adapted to receive the blade member 128 when the blade member is moved to an extended position. The front portion 163 of the blade holding member 158 housing the slot 162 is shaped and dimensioned so as to be insertably received within the housing member 154 as best illustrated in FIGS. 15 and 16 such that the membrane material associated with housing member 154 is positioned on opposite sides of the knife blade 128 as previously explained.

The extension and retraction mechanism 164 includes a slide member 170 which is fixedly attached to a belt or tape member 172 in a conventional manner. Belt member 172 is likewise attached to the front and rear pulley members 166 and 168 in a conventional manner such as by attaching the belt member 172 to an axle member or other pulley member (not shown) extending between the respective pairs of pulley members 166 and 168. Movement of the slide member 170 back and forth within the slot 174 associated with handle member 124 as best illustrated in FIGS. 15 and 16 causes the respective pulley members 166 and 168 to turn in the appropriate direction as will be hereinafter explained to extend and retract the blade member 128.

A pre-wound or spring loaded belt or tape member 176 is associated with each respective pair of pulley members 166 and 168 as best illustrated in FIG. 20. Each tape member 176 extends between the front pulley member 166 and its corresponding rear pulley member 168 and is wound around pulley member 168. Each tape member 176 includes a projection 178 as best shown in FIG. 20 which is adaptable for engaging a corresponding opening 180 associated with the rear portion of each blade member 128. When the blade member 128 is properly positioned within the blade holding member 158, the projection 178 associated with each tape member 176 will engage the respective openings 180 associated with the rear portion of each blade member 128 such that movement of the tape members 176 will cause movement of the blade member 128. In this regard, the tape members 176 are biased to a position where the projections 178 are located adjacent the rear pulley members 168 and the slide member 170 is located at the forward most point associated with slot 174 towards the front pulley members 166 as best illustrated in FIGS. 15 and 18. In this position, when the projection members 178 are engaged with the openings 180 associated with a particular blade member 128, the blade member 128 is held in its retracted position within the blade holding member 158. As the slide member 170 is moved along the slot 174 towards the roller member 126, the belt member 172 rotates the pulley members 166 and 168 such that the projection members 178 associated with tape members 176 are moved towards the front pulley members 166 thereby extending blade member 128. Slide member 170 can be moved along slot 174 until it comes into contact with the forward edge of door member 182. Door member 182 therefore acts as a stop mechanism for moving the tape members 176 in a forward direction towards pulley members 166 thereby preventing the projection members 178 from becoming disengaged with the blade openings 180 as will be hereinafter explained. It is recognized and anticipated that the pulley members 166 and 168 could be replaced with a gear system coupled to both the slide member 170 and to tape members 176 or to an equivalent structure such as a rigid member attached to the blade member 128 for moving the blade member 128 between its retracted and extended positions. Still further, it is also recognized that the blade member 128 can be extended and retracted using a wide variety of known means such as by using a spring biased member attached to the slide member and to the blade member or by using a mechanism similar to the extension and retraction mechanism associated with a ball point pen. It is further recognized and anticipated that the slide member 170 could work in reverse order whereby forward movement of the member 170 will extend blade member 128 and rearward movement of the slide member would retract the blade member.

Door member 182 is pivotally mounted to the handle member 124 and is pivotally rotated to an open position as best shown in FIGS. 17, 19 and 20. In its closed position, door member 182 overlays and covers up a portion of slot 174 thereby preventing the slide member 170 from being moved along the full length of slot 174. In contrast, when the door member 182 is pivotally rotated to its open position as illustrated in FIG. 17, the slide member 170 can be further moved rearwardly along slot 174 such that the projections 178 associated with the tape members 176 can be moved in a forward direction up to and even around the forward pulley members 166 as best shown in FIG. 20 such that each projection 178 becomes disengaged with its corresponding blade opening 180. This allows a user to remove a blade member 128 from the tool 122 by moving the door member 182 to its open position, by moving slide member 170 along substantially the full length of slot 174 to disengage the projectors 178 with the openings 180, and by thereafter pulling the blade member 128 forward out of the housing member 154 and blade holding member 158. As the tape members 176 move forward towards the pulley members 166, the blade member 128 is moved to its extended position and must be held in its extended position by maintaining thumb pressure on slide member 170. When the slide member 170 is released, tape members 176 are biased such that the slide member 170 will move forward to the position illustrated in FIG. 15 and the blade member 128 will be retracted back into blade holding member 158 and housing member 154. When the door member 182 is in its closed position, the projection members 178 cannot be moved to a position as illustrated in FIG. 20 wherein the projection members 178 are disengaged from the blade openings 180. Instead, the projection members 178 remain in engagement with the blade openings 180 and the door member 182 functions as a stop member to prevent disengagement thereof.

Blade member 128 is loaded into blade holding member 158 through the use of the pivotable door member 156. As best illustrated in FIG. 17, when the door member 156 is pivotally moved to its open position, a blade member 128 may be positioned within the cavity formed by sidewall members 184 and floor member 186 such that when door member 156 is closed, blade member 128 is pivotally rotated and moved into an operative position within blade holding member 158. This is accomplished through the use of the tensioned angled flange member or other biased member 188. As best illustrated in FIG. 16, the tensioned flange member 188 includes elevated flange portions 189 and 192 which are strategically positioned and angled such that when the door member 156 is closed, a blade member 128 sitting on floor member 186 will be biased by member 188 into it operative position within blade holding member 158 by first being rotatably moved forwardly into the front portion 163 of blade holding member 158 by elevated flange portion 192 and, as the door member 156 is moved into its fully closed position, the rear portion of the blade member 128 being further moved by elevated flange portion 189 upwardly and to the rear within member 158 so as to engage the blade openings 180 with the projections 178 associated with the spring loaded or biased tape members 176. Closing the door member 156 thereby operatively moves the blade member 128 into operative position within the door holding member 158. Other structures and components for accomplishing this task are likewise envisioned and anticipated.

It is also recognized and anticipated that the cavity formed by the side wall members 184 and the floor member 186 can function as a magazine or compartment for holding a plurality of blade members 128 one on top of the other. This magazine compartment along with tensioned flange member 188 can be shaped and dimensioned so as to hold any plurality of blade members 128 such that when a first blade member is disengaged from the projections 178 as previously explained and such blade member is removed from the tool 122 by pulling such blade member forward out of the housing member 154, a second blade member 128 will be automatically moved into operative position within the blade holding member 158 for extension and retraction as previously indicated.

The handle member 124 may likewise include an opening 190 (FIGS. 15-17) extending therethrough at a central location along the length thereof whereby a user can easily and quickly pivot the tool 122 about a finger extending through the opening 190 back and forth between the roller member 126 and the knife blade 128, depending upon which member will be used. Due to the construction and operation of the extension and retraction slide mechanism 164, the blade member 128 is always biased to a closed or retracted position such that movement of the slide member 170 merely acts against the biasing means associated with the tape members 176 to extend the blade member 128 for operative use. In this particular embodiment, the blade member 128 is not locked in its extended position but instead the slide member 170 must be held in a position as illustrated in FIG. 16 to keep the blade member 128 extended.

It is also recognized and anticipated that a wide variety of different types of cutting blades such as any one of the blade members 48 illustrated in FIG. 6 could be utilized with tool 122 and that the blade holding member 158 can be adapted to receive and hold any such blade member and that the housing member 154 can likewise be adapted to receive and hold any specially configured blade member.

Figure 21:
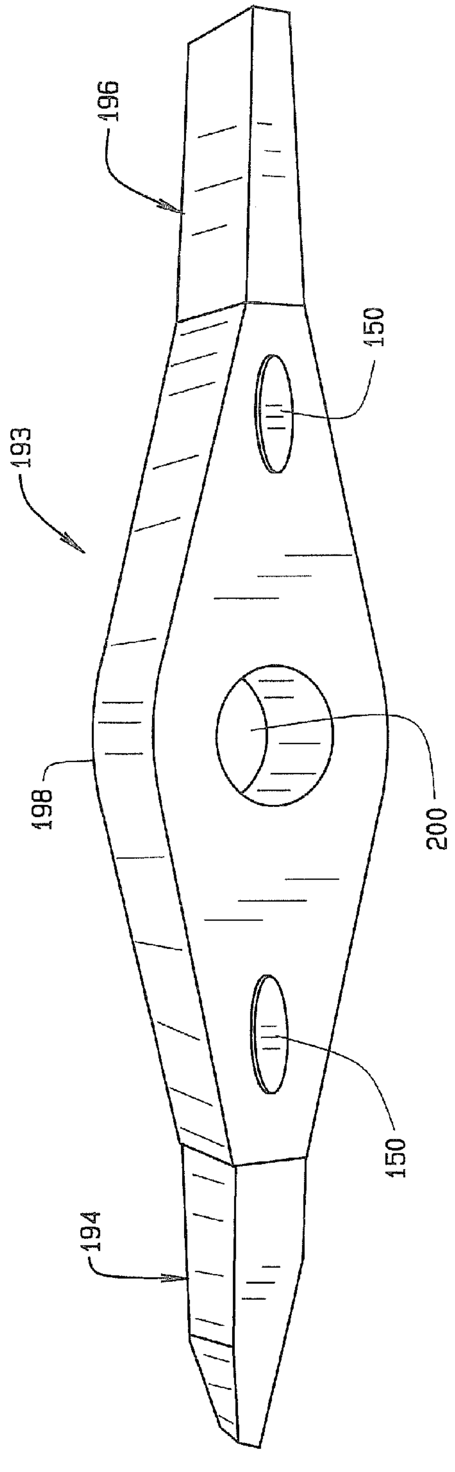
FIG. 21 is a perspective view of still another embodiment of a hand tool constructed in accordance with the teachings of the present invention.
Figure 22:
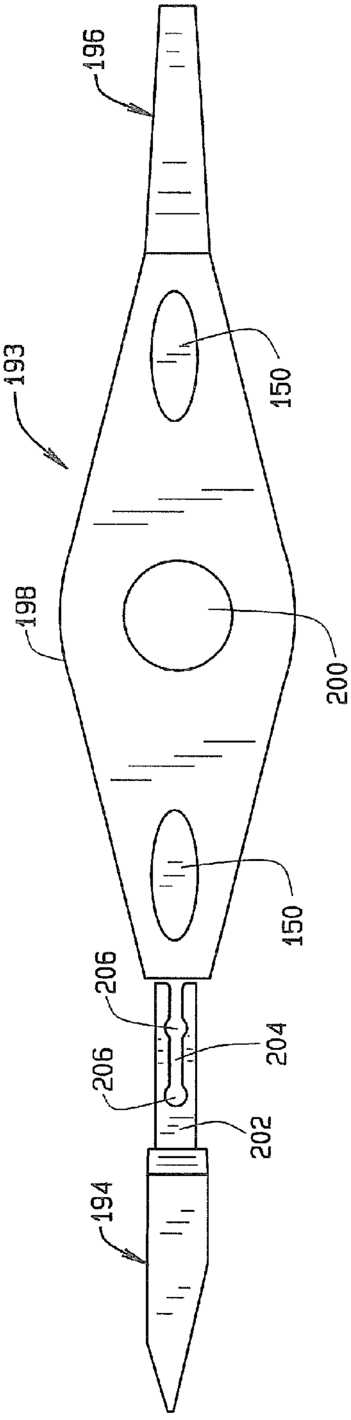
FIG. 22 is a side elevational view of the hand tool of FIG. 21 showing one of the nudger members in its removed position.

FIGS. 21 and 22 illustrate another embodiment of a hand tool 193 made in accordance with the teachings of the present invention. The tool 193 is similar to tool 122 except that it includes a pair of removably attachable nudger members 194 and 196 as compared to the roller member 126 and blade member 128. Tool 193 includes a handle member 198 having an opening 200 extending therethrough which functions and operates substantially similar to the openings 36 and 190 discussed above with respect to hand tools 10 and 122. The mechanism for removably attaching the nudger members 194 and 196 to the respective opposite end portions of the handle member 198 are substantially identical to the mechanism disclosed with respect to removably attaching the roller member 126 to the tool 122. As illustrated in FIG. 22, each nudger member could include a bracket member 202 having a slot 204 associated therewith. The slot 204 would likewise include recessed slot portions 206 similar to recessed slot portions 138. Each opposite end portion of the handle member 200 would include an opening similar to housing opening 142 and each housing end portion would include a pair of pin members 140 operatively associated with a respective push button member 150 such that each nudger member 194 and 196 could be removably attached to the handle member 198 in substantially the same fashion as previously discussed with respect to attaching roller member 126 to handle member 124. When attached, the larger diameter pin portions 146 are engaged with the recessed slot portions 206 associated with the respective nudger members 194 and 196 as previously explained.

Figure 23:
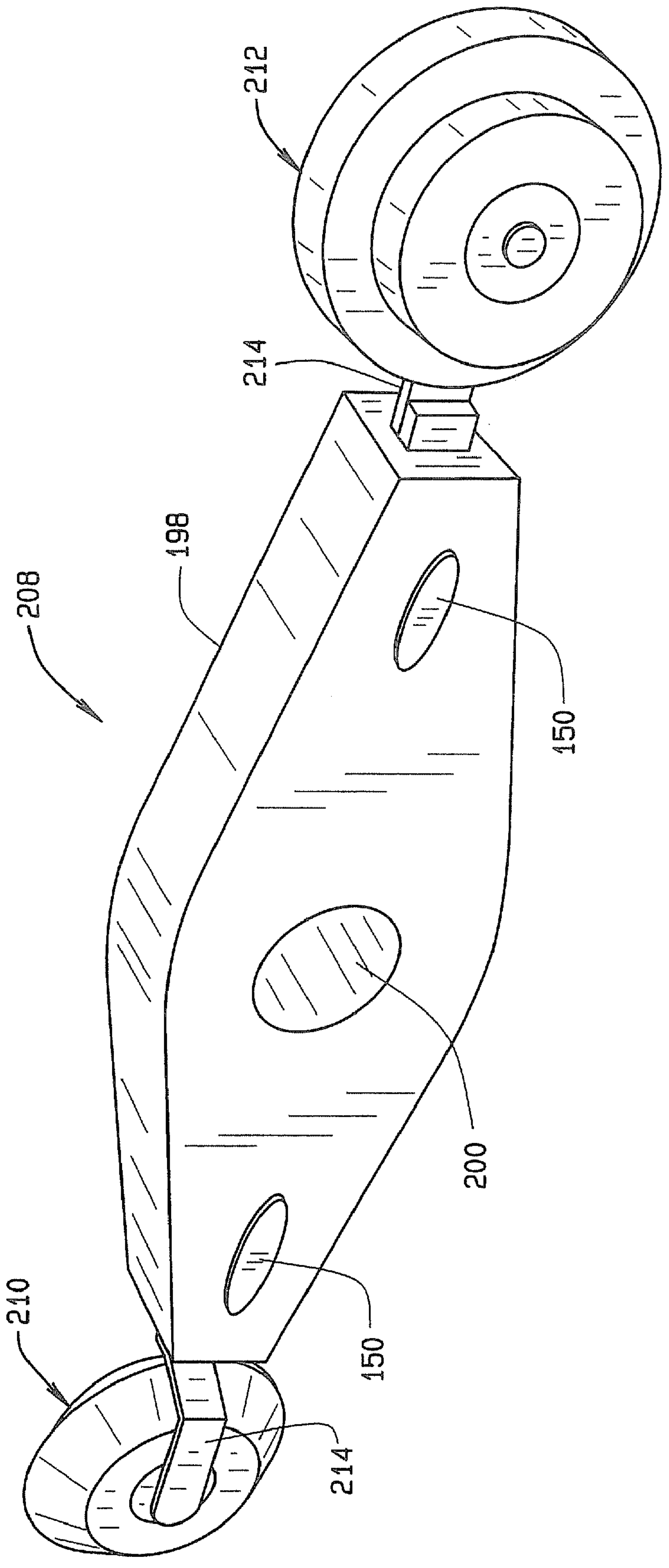
FIG. 23 is a perspective view of still another embodiment of a hand tool constructed in accordance with the teachings of the present invention wherein two roller members are removably attachable to the handle portion of the hand tool.

FIG. 23 illustrates still another embodiment of a hand tool 208 made in accordance with the teachings of the present invention. The tool 208 is again substantially similar to tool 192 except that the removably attachable nudger members 194 and 196 have been replaced with removably attachable roller members 210 and 212. The tool 208 likewise includes a handle portion 198 having opposite end portions adaptable for removably attaching two different roller members 210 and 212 as illustrated. The roller members 210 and 212 are removably attachable to the handle portion 198 in substantially the same fashion as previously described with respect to roller member 126 and nudger members 194 and 196 including use of a bracket member similar to bracket members 134 and 202, pin members 140 and push button members 150. The attachment and detachment of the respective roller members 210 and 212 is as previously described. In addition, it is important to note that roller members 210 and 212 utilize just a single bracket member 214 for removably holding the roller members 210 and 212 in their operative position instead of use of a pair of bracket members such as the bracket members 130 and 132 illustrated in FIGS. 16-18. In this regard, the roller members 210 and 212 can be permanently attached to the single bracket member 214, or such roller members can be removably attachable to such bracket member 214 using known conventional means. In all other respects, the construction and operation of the roller members 210 and 212 as well as members 134, 140 and 150 are as previously described. Still further, it is recognized that a knife blade member could be constructed for removal attachment to one end portion of handle portion 198 in substantially the same fashion as described above with respect to nudger members 194 and 196 and roller members 210 and 212 including use of a bracket member similar to bracket members 134 and 202, pin members 140, and push button member 150.

Figure 24:
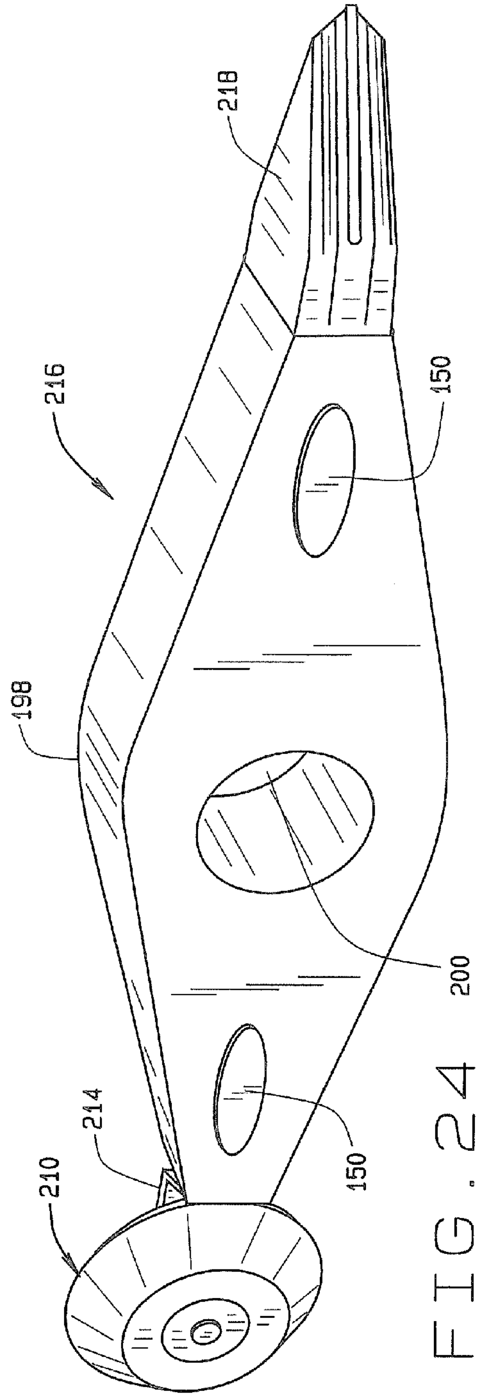
FIG. 24 is a perspective view of still another embodiment of a hand tool constructed in accordance with the teachings of the present invention wherein a removably attachable roller member is associated with one end portion of the hand tool and a removably attachable nudger member is associated with the opposite end portion of the hand tool.

Since the various roller members and nudger members associated with the present invention are removably attachable to the handle portion of the present tools such as the tools 122, 193 and 208, it is recognized and anticipated that the handle portion of any such tool such as the handle portion 198 can be outfitted with a roller member at one end portion thereof and a nudger member at the opposite end portion thereof; a pair of two different types of roller members at opposite end portions of the tool as illustrated in FIG. 23; a pair of two different types of nudger members such as illustrated with tool 193 in FIG. 21; and tool 122 illustrated in FIGS. 15-20 could be outfitted with a removably attachable blade assembly at one end portion thereof and a nudger member, instead of roller member 126, at its opposite end portion. In this regard, FIG. 24 illustrates still another embodiment of a hand tool constructed in accordance with the teachings of the present invention wherein the tool 216 includes the removably attachable roller member 210 attached to one end portion of the handle member 198 and further includes a nudger member 218 removably attached to the opposite end portion of handle portion 198. The attachment mechanism associated with nudger member 218 can be the same attachment mechanism as illustrated in FIG. 22 including bracket member 202, pin members 140, and the push button member 150. Between the tools 122, 193, 208 and 216, any combination of knife blade, roller member and nudger member can be associated with handle portions 124 and 198.

Figure 25:
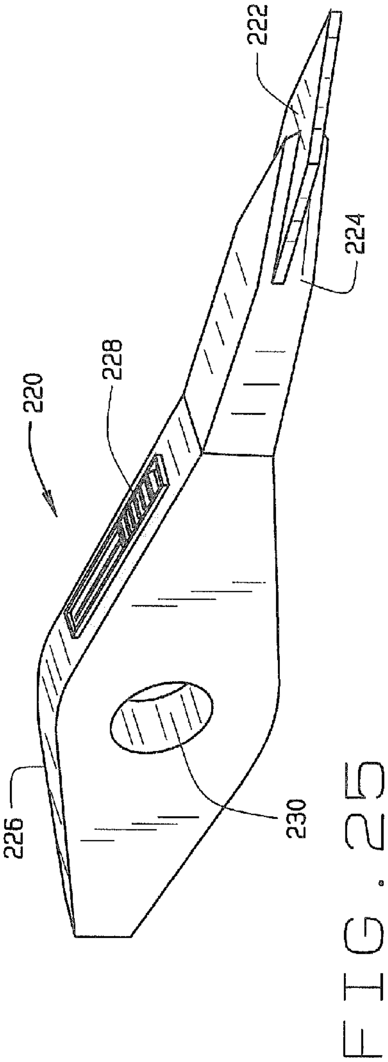
FIG. 25 is a perspective view of still another embodiment of a hand tool constructed in accordance with the teachings of the present invention.

FIG. 25 illustrates still another embodiment of a hand tool 220 made in accordance with the teachings of the present invention wherein a retractable knife blade member 222 and a nudger member 224 are located on the same side of the handle member 226. The tool 220 can be substantially similar to either tool 10 or tool 122 except that the removably attachable roller member such as roller member 14 or roller member 126 has been removed from the opposite end portion of handle member 226. Nudger member 224 is substantially similar to housing member 30 or 154 which can be permanently or removably attached to the one end portion of handle member 226. Housing member or nudger member 224 is likewise made of a soft membrane type material such as a rubber membrane material and includes an opening through which the blade member 222 will extend. When the blade member 222 is retracted within the nudger member 224 or the handle member 226, the distal end or tip of the housing member or nudger member 224 functions as a nudging tool as previously explained. In similar fashion, the extension and retraction mechanism associated with tool 220 for extension and retraction of blade member 222 can be substantially similar to all of the various extension and retraction mechanisms disclosed for moving blade member 16 and/or blade member 128 and any of these mechanisms can be incorporated into tool 220 including use of a slide member 228 as previously explained with respect to slide member 34 and slide member 170. Other variations and equivalent structures for extending and retracting blade member 222 and for the fabrication and attachment of housing member or nudger member 224 are likewise recognized and anticipated. It is also recognized that tool 220 can likewise be economically made and that the handle member 226 can take on a wide variety of different shapes and configurations including use of a centrally located opening 230.

It is also recognized and anticipated that tool members 50, 72, 74, 193, 208 and 216 could likewise be constructed with just a roller member or nudger member associated with one end portion of the handle member. These members could be fixedly attached to one end portion of the tool similar to the construction disclosed with respect to tool 72 (FIG. 9), or such members could be removably attachable to one end portion of the handle member as disclosed with respect to tools 50, 74, 193, 208 and 216. In this regard, any of the removably attachable means disclosed with respect to these tool members as well as the mechanisms disclosed with respect to the removably attachable members illustrated in FIGS. 11-24 could likewise be utilized to removably attach a roller member or a nudger member to one end portion of the handle member.

It is also recognized that if the roller members, knife blades, or nudger members are fixedly attached to their respective bracket members such as the bracket members 130, 132, 202 or 214, each individual roller member, knife blade and/or nudger member can be provided with its own bracket arrangement for removably attaching that particular member to one end portion of one of the various tools disclosed herein.

Still other attachment and detachment means can be utilized in association with any of the various tools of the present invention without departing from the spirit and scope of the present invention.

It is also recognized and anticipated that the various tools associated with the present invention including the various handle members, roller members, knife blades, and pusher or nudger members can be provided in kit form in a wide variety of different combinations such that a user can have access to the different tools and their plurality of different roller members, knife blades and nudger members for use in various combinations depending upon the particular application. In this regard, it is also recognized that all of the various roller members, knife blades and nudger members can be constructed to be cooperatively removably engageable with either end portion of the various handle members of the present tools such that any combination of all such members can be attached to any one of the present handle members to achieve a particular configuration for a particular application. Still further, it is also recognized and anticipated that still other shapes and configurations associated with the roller members, knife blades and nudger members are likewise adaptable for use with the present tools depending upon the particular application. It is further recognized that the handle members associated with the present tools can likewise be interchangeable with each other and can be used with any of the roller members, knife blades, and nudger members provided in kit form.

It is also anticipated that the overall dimensions of the various tools as well as the specific shape and configuration of the various members associated therewith such as the roller members, knife blades, pusher or nudger members, and the handle members are all subject to wide variations and may be sized and shaped into a variety of different sizes and configurations so as to be compatible for a particular application, or to conform with any space limitations associated with a particular application without impairing the teachings and practice of the present invention. Other variations and modifications to the various components comprising the present structures are also contemplated.

Thus, there has been shown and described several embodiments of various hand tools for use in applying masking tape to various surfaces so as to ensure that the masking tape is properly seated against the masked surface, which various tools fulfill all of the objects and advantages sought therefore. Many changes, modifications, variations, and other uses and applications of the various tools of the present invention will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A tool for applying tape to various surfaces comprising:
- a handle member having first and second end portions;
- a housing member selectively attachable with said first end portion of said handle member, said housing member having a distal end portion, at least a part of said distal end portion of said housing member being formed of a membrane material;
- a blade member positionable within said handle member and extendable through an opening in the distal end portion of said housing member;
- an extension and retraction mechanism operatively coupled to said blade member for moving said blade member between a first retracted position and a second position wherein said blade member is extended through said opening in said distal end portion of said housing member for operative use; and
- a roller member attachable to the second end portion of said handle member.

2. The tool defined in claim 1 wherein said handle member includes a door member for providing access for loading said blade member within said handle member, said door member being pivotable between an open and a closed position.

3. The tool defined in claim 1 wherein said extension and retraction mechanism includes a blade holding member.

4. The tool defined in claim 1 wherein said extension and retraction mechanism includes a pulley and belt mechanism for moving said blade member between said first and second positions, said pulley and belt mechanism including at least one belt member having means associated therewith for engaging said blade member.

5. The tool defined in claim 1 wherein said extension and retraction mechanism includes a magazine compartment for holding a plurality of blade members.

6. The tool defined in claim 1 wherein said roller member includes a bracket member and wherein said second end portion of said handle member includes an opening, said bracket member including an elongate slot adapted to receive at least one pin member therethrough, said elongate slot including at least one recessed portion and said at least one pin member including a reduced diameter portion and an enlarged diameter portion, said enlarged diameter portion being adapted to be received within said at least one recessed portion and said reduced diameter portion being sized to freely slide within said elongate slot, said at least one pin member being biased to a position wherein said enlarged diameter portion is positioned and located within said handle member opening so as to prevent said bracket member from being received within said handle member opening, said at least one pin member being movable to a position which will allow the reduced diameter portion thereof to be received within said elongate slot thereby allowing said bracket member to be insertably received within said handle member opening such that the at least one recessed slot portion associated with said bracket member is in alignment with the enlarged diameter portion of said at least one pin member.

7. The tool defined in claim 6 wherein when said enlarged diameter portion associated with said at least one pin member is movable into said at least one recessed slot portion associated with said bracket member for holding said bracket member within said handle member opening.

8. The tool defined in claim 6 wherein said roller member is removably attachable to said bracket member.

9. The tool defined in claim 1 wherein said handle member includes an opening extending therethrough at an intermediate location along its length, said opening being adapted to receive a finger of a user.

10. The tool defined in claim 1 including a plurality of removably attachable roller members.

11. The tool defined in claim 1 including a plurality of blade members housed within said handle member.

12. A tool for applying tape to various surfaces comprising:

a handle member having first and second end portions;

a roller member attachable to first end portion of said handle member;

a blade member positionable within said handle member and extendable through the second end portion of said handle member;

an extension and retraction mechanism operatively coupled to said blade member for moving said blade member between a first retracted position and a second position wherein said blade member is extended through the second end portion of said housing member for operative use; and said extension and retraction mechanism including a pulley and belt mechanism for moving said blade member between said first and second positions, said pulley and belt mechanism including at least one belt member having means associated therewith for engaging said blade member.

13. The tool defined in claim 12 wherein said at least one belt member engageable with said blade member is biased so as to hold said blade member in said first position.

14. The tool defined in claim 12 including a slide member attachable to said pulley and belt mechanism and movable within a slot formed in said handle member, movement of said slide member along at least a portion of said slot moving said blade member between said first and second positions.

15. The tool defined in claim 14 wherein said slide member is movable to a position within said slot which will cause said blade member to become disengaged from said extension and retraction mechanism.

16. The tool defined in claim 15 including a stop member associated with said handle member for preventing said slide member from being moved to said position within said slot at which said blade member becomes disengaged from said extension and retraction mechanism.

17. The tool defined in claim 16 wherein said stop member includes a door member pivotally attached to said handle member, said door member being movable between a closed position wherein said door member overlays a portion of said slide member slot and prevents said slide member from being moved to said position within said slot at which said blade member becomes disengaged from the extension and retraction mechanism, and an open position wherein said slide member can be moved to said position within said slot at which said blade member becomes disengaged from the extension and retraction mechanism.

* * * * *